United States Patent
Tibbits et al.

(10) Patent No.: US 10,549,505 B2
(45) Date of Patent: Feb. 4, 2020

(54) ACTIVE LATTICES

(71) Applicant: Massachusetts Institute of Technology, Cambridge, MA (US)

(72) Inventors: Skylar J. E. Tibbits, Boston, MA (US); Athina Papadopoulou, Cambridge, MA (US); Jared Smith Laucks, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 72 days.

(21) Appl. No.: 15/870,774

(22) Filed: Jan. 12, 2018

(65) Prior Publication Data

US 2018/0194106 A1 Jul. 12, 2018

Related U.S. Application Data

(60) Provisional application No. 62/445,479, filed on Jan. 12, 2017.

(51) Int. Cl.
*B32B 1/00* (2006.01)
*B32B 3/10* (2006.01)
(Continued)

(52) U.S. Cl.
CPC .................. *B32B 7/02* (2013.01); *B32B 1/00* (2013.01); *B32B 3/10* (2013.01); *B32B 3/266* (2013.01);
(Continued)

(58) Field of Classification Search
None
See application file for complete search history.

(56) References Cited

U.S. PATENT DOCUMENTS 529,719 A * 11/1894 Eils .................... A47G 27/0218
52/663
2,104,742 A * 1/1938 Fleischer ............... A63H 33/06
446/106
(Continued)

FOREIGN PATENT DOCUMENTS

AT 6615 U1 * 1/2004
DE 20 2008 015 143 U1 3/2009
(Continued)

OTHER PUBLICATIONS

Janbaz et al., Programming the shape-shifting of flat soft matter: from self-rolling/self-twisting materials to self-folding origami, Aug. 2016, Materials Horizones, Issue 6, pp. 536-547 (Year: 2016).*

(Continued)

*Primary Examiner* — Jeffrey A Vonch
(74) *Attorney, Agent, or Firm* — Hamilton, Brook, Smith & Reynolds, P.C.

(57) ABSTRACT

An active lattice capable of self-transforming responsive to a stimulus, such as heat or moisture, includes a plurality of links interconnected to each other at a plurality of nodes. At least a subset of links includes at least two materials that have different coefficients of expansion in response to an external stimulus. The two materials can be arranged in an alternating, periodic or aperiodic pattern. Embodiments can be used in apparel and sportswear, manufacturing, aviation and automotive applications, and furniture and interior products.

8 Claims, 12 Drawing Sheets

(51) Int. Cl.

| | | |
|---|---|---|
| *B32B 3/24* | (2006.01) | |
| *B32B 7/02* | (2019.01) | |
| *A63H 33/06* | (2006.01) | |
| *A63H 33/08* | (2006.01) | |
| *F16B 5/00* | (2006.01) | |
| *B32B 3/26* | (2006.01) | |
| *B32B 27/36* | (2006.01) | |
| *B32B 27/32* | (2006.01) | |
| *B32B 27/08* | (2006.01) | |
| *B32B 7/027* | (2019.01) | |
| *B32B 3/14* | (2006.01) | |

(52) U.S. Cl.
CPC .............. *B32B 7/027* (2019.01); *B32B 27/08* (2013.01); *B32B 27/32* (2013.01); *B32B 27/36* (2013.01); *A63H 33/06* (2013.01); *A63H 33/08* (2013.01); *A63H 33/084* (2013.01); *A63H 33/088* (2013.01); *B32B 3/14* (2013.01); *B32B 2307/30* (2013.01); *B32B 2307/70* (2013.01); *B32B 2307/732* (2013.01); *B32B 2323/04* (2013.01); *B32B 2367/00* (2013.01); *B32B 2419/00* (2013.01); *B32B 2437/00* (2013.01); *B32B 2479/00* (2013.01); *B32B 2605/00* (2013.01); *F16B 5/0004* (2013.01)

(56) References Cited

U.S. PATENT DOCUMENTS

| | | | |
|---|---|---|---|
| 2,414,716 A * | 1/1947 | Carson | A63H 33/105 446/112 |
| 2,490,586 A * | 12/1949 | Embree | E04B 9/34 403/346 |
| 2,680,501 A * | 6/1954 | Cunningham | F21V 11/06 52/665 |
| 2,765,159 A * | 10/1956 | Garofalo | C21D 9/0025 432/261 |
| 3,081,514 A | 3/1963 | Griswold | |
| 3,125,195 A * | 3/1964 | Moore | E06B 9/01 52/663 |
| 3,389,451 A * | 6/1968 | Speca | B21D 39/038 29/897.15 |
| 3,391,048 A | 7/1968 | Dyer et al. | |
| 3,468,748 A | 9/1969 | Bassett | |
| 4,107,870 A * | 8/1978 | Ausnit | A63H 33/06 24/589.1 |
| 4,205,152 A | 5/1980 | Mizuguchi et al. | |
| 4,290,170 A | 9/1981 | Brookstein et al. | |
| 4,575,330 A | 3/1986 | Hull | |
| 4,674,580 A | 6/1987 | Schuh | |
| 4,735,418 A | 4/1988 | Engel | |
| 4,777,859 A | 10/1988 | Plummer, Jr. | |
| 4,978,564 A | 12/1990 | Douglas | |
| 5,281,181 A * | 1/1994 | McCollum | A63H 33/044 446/106 |
| 5,853,313 A * | 12/1998 | Zheng | A63H 33/065 446/106 |
| 5,928,803 A | 7/1999 | Yasuda | |
| 6,012,494 A | 1/2000 | Balazs | |
| 6,264,199 B1 | 7/2001 | Schaedel | |
| 6,569,373 B2 | 5/2003 | Napadensky | |
| 7,007,370 B2 | 3/2006 | Gracias et al. | |
| 7,160,612 B2 | 1/2007 | Magill et al. | |
| 7,216,678 B2 | 5/2007 | Baer | |
| 7,225,045 B2 | 5/2007 | Gothait et al. | |
| 7,300,619 B2 | 11/2007 | Napadensky et al. | |
| 7,500,846 B2 | 3/2009 | Eshed et al. | |
| 7,575,807 B1 * | 8/2009 | Barvosa-Carter | F03G 7/065 428/411.1 |
| 7,851,122 B2 | 12/2010 | Napadensky | |
| 7,862,624 B2 | 1/2011 | Tran | |
| 8,082,696 B2 | 12/2011 | Oliver | |
| 8,424,249 B2 | 4/2013 | Oliver | |
| 8,475,074 B1 | 7/2013 | Henry | |
| 8,652,602 B1 * | 2/2014 | Dolla | B29C 44/357 428/36.1 |
| 8,992,183 B2 | 3/2015 | Perich et al. | |
| 9,079,337 B2 | 7/2015 | Lipton et al. | |
| D744,719 S | 12/2015 | Amarasiriwardena | |
| 9,487,387 B2 | 11/2016 | MacCurdy et al. | |
| 9,723,866 B2 | 8/2017 | Lipson et al. | |
| 9,987,907 B1 | 6/2018 | Temchenko | |
| 9,993,104 B2 | 6/2018 | Lipton et al. | |
| 10,118,339 B2 | 11/2018 | Lipton et al. | |
| 10,132,931 B2 | 11/2018 | MacCurdy et al. | |
| 10,259,161 B2 | 4/2019 | Lipton et al. | |
| 2002/0043950 A1 | 4/2002 | Yim et al. | |
| 2002/0104973 A1 | 8/2002 | Kerekes | |
| 2002/0116847 A1 | 8/2002 | Yen | |
| 2002/0125790 A1 * | 9/2002 | Horning | B81B 3/0021 310/309 |
| 2003/0090034 A1 | 5/2003 | Mulhaupt et al. | |
| 2003/0177749 A1 | 9/2003 | Jen | |
| 2004/0197519 A1 | 10/2004 | Elzey et al. | |
| 2004/0244309 A1 * | 12/2004 | Raue | A63H 33/06 52/79.1 |
| 2005/0227560 A1 | 10/2005 | Allred, III | |
| 2006/0016507 A1 | 1/2006 | Baer | |
| 2006/0184231 A1 | 8/2006 | Rucker | |
| 2006/0186700 A1 * | 8/2006 | Browne | B60J 7/04 296/187.01 |
| 2007/0036964 A1 | 2/2007 | Rosenberger et al. | |
| 2007/0106173 A1 | 5/2007 | Korotko et al. | |
| 2007/0134486 A1 | 6/2007 | Bansal et al. | |
| 2007/0163305 A1 | 7/2007 | Baer et al. | |
| 2008/0027199 A1 | 1/2008 | Mazurek et al. | |
| 2008/0057809 A1 * | 3/2008 | Rock | D03D 15/0027 442/64 |
| 2008/0066393 A1 | 3/2008 | Sorensen | |
| 2008/0075850 A1 * | 3/2008 | Rock | D06M 15/263 427/176 |
| 2008/0075930 A1 * | 3/2008 | Kornbluh | B64C 3/48 428/189 |
| 2008/0105324 A1 | 5/2008 | Baer | |
| 2008/0109103 A1 * | 5/2008 | Gershenfeld | B33Y 50/02 700/119 |
| 2008/0234458 A1 | 9/2008 | West | |
| 2008/0269420 A1 | 10/2008 | Tong et al. | |
| 2008/0282527 A1 | 11/2008 | Beck et al. | |
| 2009/0176054 A1 * | 7/2009 | Laib | A41D 13/005 428/137 |
| 2009/0218307 A1 * | 9/2009 | Davies | G09F 3/02 215/365 |
| 2009/0233067 A1 * | 9/2009 | Doornheim | B32B 7/02 428/203 |
| 2010/0168439 A1 | 7/2010 | Olson | |
| 2010/0199582 A1 | 8/2010 | Oliver et al. | |
| 2011/0285052 A1 | 11/2011 | Wigand et al. | |
| 2012/0037263 A1 | 2/2012 | Malloy | |
| 2012/0068378 A1 | 3/2012 | Swanson et al. | |
| 2012/0091744 A1 * | 4/2012 | McKnight | B60R 11/00 296/24.34 |
| 2012/0094060 A1 * | 4/2012 | Gershenfeld | B32B 5/12 428/99 |
| 2012/0133080 A1 | 5/2012 | Moussa et al. | |
| 2012/0137611 A1 | 6/2012 | Oliver | |
| 2012/0308805 A1 | 12/2012 | Sella | |
| 2013/0040091 A1 | 2/2013 | Dikovsky et al. | |
| 2013/0073068 A1 | 3/2013 | Napadensky | |
| 2013/0078415 A1 | 3/2013 | Rock | |
| 2013/0089642 A1 | 4/2013 | Lipson et al. | |
| 2013/0243997 A1 * | 9/2013 | Spadaccini | B32B 1/06 428/116 |
| 2013/0246018 A1 * | 9/2013 | Spadaccini | G06F 17/5009 703/2 |
| 2013/0249981 A1 | 9/2013 | Nakagawa | |
| 2014/0013962 A1 | 1/2014 | Lipton et al. | |
| 2014/0037873 A1 * | 2/2014 | Cheung | B32B 3/06 428/34.1 |
| 2014/0050811 A1 | 2/2014 | Lipton et al. | |
| 2014/0059734 A1 | 3/2014 | Toronjo | |

(56) References Cited

U.S. PATENT DOCUMENTS

| | | |
|---|---|---|
| 2014/0101816 A1 | 4/2014 | Toronjo |
| 2014/0311187 A1 | 10/2014 | Amarasiriwardena et al. |
| 2015/0014881 A1 | 1/2015 | Elsey |
| 2015/0017411 A1 | 1/2015 | Wilkie et al. |
| 2015/0075033 A1 | 3/2015 | Cross et al. |
| 2015/0158244 A1* | 6/2015 | Tibbits .................. C08F 220/20 428/516 |
| 2015/0174885 A1 | 6/2015 | Khan |
| 2016/0023403 A1 | 1/2016 | Ramos |
| 2016/0067918 A1 | 3/2016 | Millar |
| 2016/0101594 A1 | 4/2016 | Tibbits et al. |
| 2016/0121546 A1* | 5/2016 | Yao ........................ B33Y 10/00 428/221 |
| 2016/0208476 A1* | 7/2016 | Wadley ...................... C23C 8/22 |
| 2016/0214321 A1 | 7/2016 | Tow et al. |
| 2016/0317939 A1* | 11/2016 | Fernandez ............ A63H 33/084 |
| 2016/0318255 A1* | 11/2016 | Ou ...................... G05B 19/4099 |
| 2016/0340814 A1 | 11/2016 | Ridley et al. |
| 2016/0340826 A1 | 11/2016 | Tibbits et al. |
| 2017/0042034 A1 | 2/2017 | MacCurdy et al. |
| 2017/0057704 A1* | 3/2017 | Li .......................... B65D 39/12 |
| 2017/0120535 A1 | 5/2017 | MacCurdy et al. |
| 2017/0145694 A1* | 5/2017 | Carney .................... B64C 1/068 |
| 2017/0182723 A1* | 6/2017 | Calisch ................ B31D 3/0207 |
| 2017/0326785 A1 | 11/2017 | MacCurdy et al. |
| 2018/0156204 A1 | 6/2018 | Lipton |
| 2018/0187337 A1 | 7/2018 | Iseki |
| 2018/0195213 A1 | 7/2018 | Tibbits et al. |
| 2018/0281295 A1 | 10/2018 | Tibbits et al. |
| 2018/0291535 A1 | 10/2018 | Ridley et al. |
| 2018/0311833 A1 | 11/2018 | Lipton et al. |
| 2019/0084282 A1 | 3/2019 | Prasad et al. |

FOREIGN PATENT DOCUMENTS

| | | | | |
|---|---|---|---|---|
| DE | 202009000527 U1 | * | 3/2009 | ............... E04B 1/19 |
| FR | 1331581 A | * | 7/1963 | |
| FR | 1243060 A | * | 10/1967 | |
| FR | 2479923 A1 | * | 10/1981 | ............. A63H 33/06 |
| FR | 2956590 A1 | * | 8/2011 | ........... A63H 33/084 |
| GB | 2455167 A | * | 6/2009 | ............... G01L 7/02 |
| JP | H07 42024 A | | 2/1995 | |
| WO | WO 00/69747 A1 | | 11/2000 | |
| WO | 2001/78968 A1 | | 10/2001 | |
| WO | 2014014892 A2 | | 1/2014 | |
| WO | WO-2014025089 A1 | * | 2/2014 | |
| WO | WO 2015/084422 A1 | | 6/2015 | |
| WO | WO 2015/139095 A1 | | 9/2015 | |
| WO | WO 2016/057853 A1 | | 4/2016 | |
| WO | WO 2017/079475 A1 | | 5/2017 | |
| WO | 2017081040 A1 | | 5/2018 | |
| WO | WO-2018088965 A1 | * | 5/2018 | ............. B29C 51/00 |
| WO | 2018/187514 A1 | | 10/2018 | |

OTHER PUBLICATIONS

Mao et al., 3D Printed Reversible Shape Changing Components with Stimuli Responsive Materials, Apr. 2016, Scientific Reports, Issue 6 (Year: 2016).*
Raviv et al., Active Printed Materials for Complex Self-Evolving Deformations,Dec. 2014, Scientific Reports, Issue 6 (Year: 2014).*
Xu et al., Structurally Efficient Threedimensional Metamaterials with Controllable Thermal Expansion, Oct. 2016, Scientific Reports, vol. 6 (Year: 2016).*
Ge et al., Active origami by 4D printing, Aug. 2014, Smart Materials and Structures, vol. 23, No. 9 (Year: 2014).*
Zhang et al., Smart three-dimensional lightweight structure triggered from a thin composite sheet via 3D printing technique, Feb. 2016, Scientific Reports, vol. 6 (Year: 2016).*
Auxetics, auxetic 3D honeycomb, Jan. 2015, <https://youtu.be/2WkFS1wYWLA> (Year: 2015).*
Ghiuzan, Deployable structures, Mar. 2016, <https://youtu.be/E-IqvGAfQ68> (Year: 2016).*
Tu Delft, 4D Printing for Freeform Surfaces: Design Optimization of Origami Structures, May 2015, <https://youtu.be/vQB49vNFu14> (Year: 2015).*
Neville et al., Shape morphing Kirigami mechanical metamaterials, Aug. 2016, Scientific Reports, vol. 6 (Year: 2016).*
Rossiter et al., Shape memory polymer hexachiral auxetic structures with tunable stiffness, Feb. 2014, Smart Materials and Structures, vol. 23, No. 9 (Year: 2014).*
Farahi, Caress of the Gaze: A Gaze Actuated 3D Printed Body Architecture,Oct. 2016 (Year: 2016).*
Bouten, Transformable Structures and their Architectural Application, 2015 (Year: 2015).*
Zhang et al., Pattern Transformation of Heat-Shrinkable Polymer by Three-Dimensional (3D) Printing Technique, Mar. 2015, Scientific Reports, vol. 5 (Year: 2015).*
Ionov, Soft microorigami: self-folding polymer films, May 2011, Soft Matter, vol. 7 (Year: 2011).*
Gatt et al., On the behaviour of bi-material strips when subjected to changes in external hydrostatic pressure, Jan. 2009, Scripta Materialia, vol. 60, Issue 2, pp. 65-67 (Year: 2009).*
3D Printing (Photolithography), MRSEC Education Group, University of Wisconsin-Madison. Accesed: Nov. 23, 2016.
A Brief History of 3D Printing, T. Rowe Price, 1 page (2012).
About Additive Manufacturing, Additive Manufacturing Research Group, Loughborough University, copyright 2016, http://www.lboro.ac.uk!research/amrg/about/the7categoriesofadditivemanufacturing/.
Aguilera, E., et al., "3D Printing of Electro Mechanical Systems," *24th International SFF Symposium—An Additive Manufacturing Conference*, SFF 2013, pp. 950-961 (2013).
Ahn, J-H., et al., "Heterogeneous Three-Dimensional Electronics by Use of Printed Semiconductor Nanomaterial," *Science*, 314: 1754-1757 (2006).
Akhavan, V., et al., "Reacting Thick-Film Copper Conductive Inks with Photonic Curing," 5 pages (2013).
Altan, T., et al., "Manufacturing of Dies and Molds," 19 pages (2001).
Armon, Shahaf et al., "Geometry and Mechanics in the Opening of Chiral Seed Pods," *Science*, 333: 1726-1730 (2011).
Bailey, S.A., et al., "Biomimetic Robotic Mechanisms Via Shape Deposition Manufacturing," pp. 1-8 (2000).
Bartlett, Nicholas W., et al., "A 3D-printed, functionally graded soft robot powered by combustion," *Science*, 349(6244): 161-166 (Jul. 10, 2015).
Bendsøe, M.P. and Kikuchi, N., "Generating Optimal Topologies in Structural Desing Using a Homogenization Method," *Comp. Meth. App. Mech. Eng.*, 71: 197-224 (1988).
Berman, B., "3-D Printing: The New Industrial Revolution," *Business Horizons*, 55: 155-162 (2012).
Bhargava, K. et al., "Discrete Elements for 3D Microfluidics," *PNAS*, 111(42): 15013-15018 (2014).
Bicchi, A. and Tonietti, G., "Fast and 'Soft-Arm' Tactics," *IEEE Robotics & Automation Magazine*, 22-33 (2004).
Blakely, Andrew M., "Bio-Pick, Place, and Perfuse: A New Instrument for 3D Tissue Engineering," *Tissue Engineering: Part C*, vol. 00, No. 00, pp. 1-10 (2015).
Borghino, D., "Voxel8 Paves the Way for 3D-Printed Electronics," Accessed at www.gizmag.com pp. 1-6 (Jan. 14, 2015).
Bruyas, A., et al., "Combining Multi-Material Rapid Prototyping and Pseudo-Rigid Body Modeling for a New Compliant Mechanism," *2014 IEEE International Conference on Robotics & Automation (ICRA)*, pp. 3390-3396 (2014).
Cali, J., et al., "3D-Printing of Non-Assembly, Articulated Models," *ACM Trans. Graph., Article No. 130*, 31(6): 1-8 (2012).
Cantatore, E., "Applications of Organic and Printed Electronics, A Technology-Enabled Revolution," Springer Publishers, ISBN No. 978-1-4614-3159-6, pp. 1-187 (2013).
Chandler, David L. Printing off the Paper. MIT News (2011); available at: http://web.mit.edu/newsoffice/2011/3d-printing-0914.html, 4 pages, (last visited: Mar. 3, 2014).
Cheney, N., et al., "Unshackling Evolution," *SIGEVOlution*, 7(1): 11-23 (2013).

(56) References Cited

OTHER PUBLICATIONS

Christenson, K.K., et al., "Direct Printing of Circuit Boards Using Aerosol Jet®," *Tech. Prog. Proc.*, pp. 433-436 (2011).
Church, K., et al., "Commercial Applications and Review for Direct Write Technologies," *Mat. Res. Soc. Symp. Proc., 624*: 3-8 (2000).
Comber, D.B., et al., "Design, Additive Manufacture, and Control of a Pneumatic MR-Compatible Needle Driver," *IEEE Trans. Rob.*, 1-12 (2015).
Coros, S., et al., "Computational Design of Mechanical Characters," 12 pages (2013).
De Laurentis, K.J., et al., "Procedure for Rapid Fabrication of Non-Assembly Mechanisms with Embedded Components," *Proceedsing of DETC'02: ASME 2002 Design Engineering Technical Conferences and Computers and Information in Engineering Conference*, pp. 1-7 (2002).
Derby, B., "Inkjet Printing of Functional and Structural Materials: Fluid Property Requirements, Feature Stability, and Resolution," *Annu. Rev. Mater. Res., 40*: 395-414 (2010).
Dimas, L.S., et al., "Tough Composites Inspired by Mineralized Natural Materials: Computation, 3D Printing, and Testing," *Adv. Funct. Mater.*, 23(36): 1-10 (2013).
Doubrovski, E.L., et al., "Voxel-Based Fabrication Through Material Property Mapping: A Design Method for Bitmap Printing," *Computer-Aided Design*, 60: 3-13 (2015).
Dutta, D., et al., "Layered Manufacturing: Current Status and Future Trends," *Trans. ASME*, 1:60-71 (Mar. 2001).
Eaton, M., et al., "The Modelling, Prediction, and Experimental Evaluation of Gear Pump Meshing Pressures with Particular Reference to Aero-Engine Fuel Pumps," *Proc. IMechE*, 220 (Part 1): 365-379 (2006).
Espalin, D., et al., "3D Printing Multifunctionality: Structures with Elements," *Int. J. Adv. Manuf. Technol.*, 72: 963-978 (2014).
Ferry, P.W., et al., "A Review on Stereolithography and Its Applications in Biomedical Engineering," *Biomat.*, 31: 6121-6130 (2010).
Fuller, S.B., et al., "Ink-Jet Printed Nanoparticle Microelectromechanical Systems," *J. Microelec. Sys.*, 11(1): 54-60 (2002).
Ge, Qi, et al., "Active materials by four-dimension printing," *Applied Physics Letters*, 103: 131901-131901-5 (2013).
Gong, H., et al., "High Density 3D Printed Microfluidic Valves, Pumps, and Multiplexers, Lab on a Chip" *Royal Society of Chemistry*, 9 pages (2016).
Grunewald, S., "Nano Dimension Unveils the DragonFly 2020, World's First Desktop Electronic 3D Printer," *Downloaded from https://3DPrint.com, The Voice of 3D Printing Technologies*, pp. 1-5 (Nov. 18, 2015).
Grzesiak, A., et al., "The Bionic Handling Assistant: A Success Story of Additive Manufacturing," Assemb. Autom., 31(4): 329-333 (2011).
Guan, J. et al. "Self-Folding of Three-Dimensional Hydrogel Microstructures," *Journal of Physical Chemistry B*, 109:23134-23137 (2005).
Hawkes et al. Programmable matter by folding, *PNAS*, vol. 107(28): 12441-12445 (2010).
Hiller, J. and Lipson, H., "Automatic Design and Manufacture of Soft Robots," IEEE Trans. Rob., 28(2): 457-466 (2012).
Hiller, J. and Lipson, H., "Methods of Parallel Voxel Manipulation for 3D Digital Printing," pp. 200-211 (2007).
Hiller, J. and Lipson, H., "Tunable Digital Material Properties for 3D Voxel Printers," *Rapid Prototyping Journal*, 16(4): 241-247 (2009).
Hiller, J.D., et al., "Microbricks for Three-Dimensional Reconfigurable Modular Microsystems," *J. Microelec. Sys.*, 20(5): 1089-1097 (2011).
Huber, C., et al., 3D Print of Polymer Bonded Rare-Earth Magnets, and 3D Magnetic Field Scanning with an End-User 3D Printer, *Applied Physics Letters*, 109: 162401-1-162401-4 (2016).
Ionov, L., "Soft Microorigami: self-folding polymer films," *Soft Matter*, 7: 6786 (Published online May 24, 2011).
Jeffrey, C., "V-One Conductive Ink Printer Aims to Short-Circuit Electronic Prototyping," accessed on www.gizmag.com pp. 1-6 (Feb. 10, 2015).

Jeong, K-U. et al., "Three-dimensional actuators transformed from the programmed two-dimensional structures via bending, twisting and folding mechanisms," *Journal of Materials Chemistry*, 21: 6824-6830 (2011).
Jung et al., "Water-responsive shape memory polyurethane block copolymer modified with polyhedral oligomeric silsesquioxane," *Journal of Macromolecular Science, Part B*, 45: 453-461 (2006).
Kang, H., et al., "Direct Intense Pulsed Light Sintering of Inkjet-Printed Copper Oxide Layers within Six Milliseconds," *ACS Appl. Mater. Interfaces*, 6:1682-1687 (2014).
Kanthal Thermostatic Bimetal Handbook, Kanthal AB, pp. 1-134 (2008).
Klein, Yael, et al. "Shaping of Elastic Sheets by Prescription of Non-Euclidean Metrics," *Science*, 315:1116-1120 (2007).
Kolesky, D.B., et al., "3D Bioprinting of Vascularized, Heterogeneous Cell-Laden Tissue Constructs," *Adv. Mater.*, 26:3124-3130 (2014).
Kong, Y.L., et al., "3D Printed Quantum Dot Light-Emitting Diodes," *Nano. Lett.*, 14:7017-7023 (2014).
Kruth, J.P., et al., "Progress in Additive Manufacturing and Rapid Prototyping," *Annals CIRP*, 47(2): 525-540 (1998).
Kuehn, T. and Rieffel, J., "Automatically Designing and Printing 3-D Objects with EvoFab 0.2," *Artificial Life*, 13: 372-378 (2012).
Laschi, C., et al., "Soft Robot Arm Inspired by the Octopus," *Adv. Rob.*, 26: 709-727 (2012).
Li, B., et al., "Robust Direct-Write Dispensing Tool and Solutions for Micro/Meso-Scale Manufacturing and Packaging," *ASME Proceedings of the 2007 International Maufacturing Science and Engineering Conference*, pp. 1-7 (2007).
Li, X., "Embedded Sensors in Layered Manufacturing," *Dissertation submitted to Stanford University*, pp. 1-152 (Jun. 2001).
Lin, H.-T., et al., "GoQBot: A Caterpillar-Inspired Soft-Bodied Rolling Robot," Bioinsp. Biomim., 6: 1-14 (2011).
Lipson, H., "Challenges and Opportunities for Design, Simulation, and Fabrication of Soft Robots," Soft Robotics, 1(1): 21-27 (2014).
Lipson, H., and Kurman, M., "Factory@Home—The Emerging Economy of Personal Manufacturing," One of a series of Occasional Papers in Science and Technology Policy, pp. 1-103 (Dec. 2010).
Lipton, J. et al., "Fab@Home Model 3: A More Robust, Cost Effective and Accessible Open Hardware Fabrication Platform," 125-135 (2012).
Liu, Y., et al., "Self-Folding by Local Light Absorption," screenshots provided, full video available at: http://www.youtube.com/watch?v=NKRWZG67dtQ, pp. 1-10, (Nov. 10, 2011).
Liu, Y., et al., "Self-folding of polymer sheets using local light absorption," Soft Matter 8(6): 1764-1769 (2012).
Louis-Rosenberg, J., "Drowning in Triangle Soup: The Quest for a Better 3-D Printing File Format," *XRDS*, 22(3): 58-62 (2016).
MacCurdy, R., et al., "Bitblox: Printable Digital Materials for Electromechanical Machines," Int'l J. Robotics Res., 33(10), 1342-1360 (2014).
MacCurdy, R., et al., "Printable Hydraulics: A Method for Fabricating Robots by 3D Co-Printing Solids and Liquids," *2016 IEEE International Conference on Robotics and Automation (ICRA)*, pp. 1-8 (2016).
MacCurdy, R., et al., "Printable Programmable Viscoelastic Materials for Robots," *IEEE/RSJ International Conference on Intelligent Robots and Systems (IROS)*, pp. 1-8 (2016).
MacDonald, E., et al., "3D Printing for the Rapid Prototyping of Structural Electronics," *IEEE*, 2:234-242 (2014).
Macdonald, N.P., et al., "Assessment of Biocompatibility of 3D Printed Photopolymers Using Zebrafish Embryo Toxicity Assays," *Royal Society of Chemistry—Lab on a Chip*, 16: 291-297 (2016).
Mack, E., "Beyond 3D Printers and the Coming of the Home Electronics Factory," www.gizmag.com, pp. 1-5 (Oct. 22, 2014).
Malone, E., and Lipson, H., "Multi-Material Freeform Fabrication of Active Systems," *Proceedings of the 9th Biennial ASME Conference on Engineering Systems Design and Analysis*, pp. 1-9, (2008).
Mannoor, M.S., et al., "3D Printed Bionic Ears," *Nano. Lett.*, 13: 2634-2639 (2013).

(56) References Cited

OTHER PUBLICATIONS

Mao, Y., et al., "Scientific Reports: Sequential Self-Folding Structures by 3D Printed Digital Shape Memory Polymers," *Nature*, pp. 1-12 (2015).
Marchese, A.D., et al., "A Recipe for Soft Fluidic Elastomer Robots," *Soft Robotics*, 2(1): 7-25 (2015).
Mehta, A., et al., "Cogeneration of Mechanical, Electrical, and Software Design for Printable Robots from Structural Specifications," *Int. Rob. Sys.*: 2892-2897 (2014).
Mehta, A., et al., "Integrated Codesign of Printable Robots," *J. Mech. Rob.*, 7: 1-10 (2015).
Meisel, N.A., et al., "A Procedure for Creating Actuated Joints Via Embedding Shape Memory Alloys in Polyj et 3D Printing," *J. Intel. Mat. Sys. Struct.*, pp. 1-15 (2014).
Melchels, F. P.W., et al., "A review on stereolithography and its applications in biomedical engineering," *Biomaterials*, 31:6121-6130 (2010).
Merz, R, "Shape Deposition Manufacturing," *Proceedings of the Solid Freeform Fabrication Symposium, The University of Texas at Austin*, pp. 1-7 (1994).
Merz, R, et al., Dissertation entitled "Shape Deposition Manufacturing," pp. 1-190 (1994).
Mironov, V., et al., "Organ Printing: Computer-Aided Jet-Based 3D Tissue Engineering," *Trends Biotech.*, 21(4):157-161 (2003).
Morin, S.A., et al., "Using "Click-e-Bricks" to Make 3D Elastomeric Structures", *Adv. Mater.*, 26: 5991-5999 (2014).
Mueller, S., et al., "faBrickation: Fast 3D Printing of Functional Objects by Integrating Construction Kit Building Blocks," *Session: 3D Printing and Fabrication*, 3827-3834 (2014).
Mueller, S., et al., "Mechanical Properties of Parts Fabricated with Inkjet 3D Printing Through Efficient Experimental Design," *Materials and Design*, 86:902-912 (2015).
Murphy, S.V. and Atala, A., "3D Bioprinting of Tissues and Organs," *Nat. Biotech.*, 32(8):773-785 (2014).
Murray, C., "Smart Actuator Propels Hydraulic 'Beast of Burden'", Design News [online], Jun. 4, 2015 [retrieved Oct. 21, 2016]. Retrieved from the Internet URL: http://www.designnews.com/document.asp?doc_id=277754.
"Muscle Fiber Organization" acquired from https://oli.cmu.edu/jcourse/workbook/activity/page?context=df3c7ca90a0001dc2a2c9e4d7976ae35 on Mar. 18, 2018.
O'Donnell, J., et al., "A Review on Electromechanical Devices Fabricated by Additive Manufacturing," *J. of Manufacturing Science and Engineering*, pp. 1-45 (2015).
Palmer, J.A., et al., "Realizing 3-D Interconnected Direct Write Electronics within Smart Stereolithography Structures," *Proceedings of IMECE2005-2005 ASME International Mechanical Engineering Congress and Exposition*, pp. 1-7 (2005).
Park, S., et al., "Self- Assembly of Mesoscopic Metal-Polymer Amphiphiles," *Science*, 303: 348-351 (2004).
Peele, B.N., et al., "3D Printing Antagonistic Systems of Artificial Muscle Using Projection Stereolithography," *Bioinspir. Biomim.*, 10:1-8 (2015).
Popescu, G. A., et al., "Digital Materials for Digital Printing," *Soc. Imaging Sci. Tech.*, pp. 58-61 (2006).
Popescu, G.A., "Digital Materials for Digital Fabrication," Thesis submitted to Massachusetts Institute of Technology, pp. 1-53 (Aug. 20, 2007).
Proto3000: "3D Printed Snow Globe by Proto3000—Thingiverse," Retrieved from the internet: http://www.thingiverse.com/thing:225572, Retrieved on: Jan. 10, 2017.
Rost, A., and Schädle, S., "The SLS-Generated Soft Robotic Hand—An Integrated Approach Using Additive Manufacturing and Reinforcement Learning," *IEEE*: 215-220 (2013).
Rus, D. and Tolley, M.T., "Design, Fabrication and Control of Soft Robots," *Nature*, 521: 467-475 (2015).
Russo, A., et al., "Pen-On-Paper Flexible Electronics," *Adv. Mater.*, 23: 3426-3430 (2011).

Saari, M., et al., "Fiber Encapsulation Additive Manufacturing: An Enabling Technology for 3D Printing of Electromechanical Devices and Robotic Components," *3D Printing*, 2(1):32-39 (2015).
Safari, A., et al., "Solid Freeform Fabrication of Piezoelectric Sensors and Actuators," *J. Mat. Sci.*, 41: 177-198 (2006).
Saleh, E., et al., "3D Inkjet-Printed UV-Curable Inks for Multi-Functional Electromagnetic Applications," *Proceedings of ISFA2014*, pp. 1-5 (2014).
Sangani, K., "How to . . . Print Gadgets," *Engineering & Technology*, pp. 58-60 (2013).
Sharon, E. et al., "The Mechanics of Non-Euclidean Plates," *Soft Matter*, 6: 5693-5704 (2010).
Sharon, Eran et al., "Leaves, Flowers and Garbage Bags: Making Waves," *American Scientist*, 92: 254-261 (2004).
Sharon, Eran., "Swell Approaches for Changing Polymer Shapes," *Science*, 335: 1179-1180 (2012).
Sitthi-Amorn, P., et al., "MultiFab: A Machine Vision Assisted Platform for Multi-Material 3D Printing," *ACM Transactions on Graphics*, Article No. 129, 34(4): 1-11 (2015).
"Skeletal Muscle Organ Anatomy" acquired from https://oli.cmu.edu/jcourse/workbook/activity/page?context=b880ee6b80020ca601351c786c5dfea8 on Mar. 18, 2018.
Slightam, J.E. and Gervasi, V.R., "Novel Integrated Fluid-Power Actuators for Functional End-Use Components and Systems Via Selective Laser Sintering Nylon 12," *23rd Ann Int Solid Freeform Fabrication Symp*: pp. 197-211 (2012).
Slotwinski, J.A., "Materials Standards for Additive Manufacturing," *National Institute of Standards and Technology (NIST), PDES, Inc. Workshop* (Mar. 14, 2013).
Snyder, T.J., et al., "3D Systems' Technology Overview and New Applications in Manufacturing, Engineering, Science, and Education," *Mary Ann Liebert, Inc.*, 1(3):169-176 (2014).
Takatsu, H., et al., "Stress Analysis Method of U-Shaped Bellows and Its Experimental Verification," *Fusion Eng. & Des.*, 22: 239-250 (1993).
Tanaka, M., "Fatigue Life Estimation of Bellows Based on Elastic-Plastic Calculations," *Int. J. Pres. Ves. & Piping*, 2: 51-68 (1974).
Thomaszewski, B., et al.,"Computational Design of Linkage-Based Characters," 9 pages (2014).
Thryft, Ann R., "3D Printing Now Good Enough for Final & Spare Car Parts," downloaded from www.designnews.com, 3 pages, (Jul. 22, 2016).
Tibbets, S. and Cheung, K., "Programmable Materials for Architectural Assembly and Automation," *Assembly Automation*, 32(3): 216-225 (2012).
Tibbits, S., "4D Printing: Self-Assembling Parts in Action at TED2013," by Stratasys Staff (Apr. 29, 2013).
Tibbits, Skylar J.E,. "4D Printing: Multi-Material Shape Change," *Architectural Design Journal* 84: 116-121 (2014).
Tibbits, Skylar., "Design to Self Assembly," *Architectural Design Journal*,82(2): 68-73 (2012).
Tibbits, Skylar., "The Emergence of 4D Printing," TED Talk filed in Feb. 2012; transcript provided, 6 pages, video available at http://www.ted.com/talks/skylar_tibbits_the_emergence_of_4d_printing.html.
Tolley, M.T., et al., "A Resilient, Untethered Soft Robot," *Soft Robotics*, 1(3): 213-223 (2014).
Torrisi, F., et al., "Inkjet-Printed Graphene Electronics," *Am. Chem. Soc.*, 6(4): 2992-3006 (2012).
Tumbleston, J.R., et al., "Continuous Liquid Interface Production of 3D Objects," *Research Reports*, 347(6228): 1349-1353 (2015).
Tunisianswife, Easy Chocolate Bundt Cake Glaze (allrecipies.com accessed Jun. 6, 2016) http:/ /all recipes. com/recipe/1 00335/ easy -choco late-bu ndt -cake-glaze/.
Ultem®/PEI (Polyetherimide): Aetna Plastics, Accessed: Jun. 1, 2016.
Waheed, S., "3D Printed Microfluidic Devices: Enablers and Barriers," *Royal Society of Chemistry, Lab on a Chip*, 16: 1993-2013 (2016).
Walker, S.B. and Lewis, J.A., "Reactive Silver Inks for Patterning High-Conductivity Features at Mild Temperatures," *Am. Chem. Soc.*, 134: 1419-1421 (2012).

(56) References Cited

OTHER PUBLICATIONS

Wang, L., et al., "Robotic Folding of 2D and 3D Structures from a Ribbon," *IEEE International Conference on Robotics and Automation (ICRA)*, pp. 3655-3660 (2016).
Weiss, L., et al.,"Shape Deposition Manufacturing of Wearable Computers," pp. 31-38 (1996).
Weiss, L.E., et al., "Shape Deposition Manufacturing of Heterogeneous Structures," *J. Manu. Sys.*, 16(4): 239-248 (1997).
Westbrook, K.K., et al., "A 3D finite deformation constitutive model for amorphous shape memory polymers: A multi-branch modeling approach for nonequilibrium relaxation processes," *Mechanics of Materials 43*: 853-869 (2011).
Whitney, J. P., et al., "A Low-Friction Passive Fluid Transmission and Fluid-Tendon Soft Actuator," 8 pages (2014).
Willis, K.D.D., et al., "Printed Optics: 3D Printing of Embedded Optical Elements for Interactive Devices," *UIST'12*, pp. 589-598 (Oct. 2012).
Wu, S-Y., et al., "3D-Printed Microelectronics for Integrated Circuitry and Passive Wireless Sensors," *Microsystems & Nanoengineering*, 1:1-9 (2015).
Xia, Fan and Jiang, Lei., "Bio-Inspired, Smart, Multiscale Interfacial Materials," *Advanced Materials* (20): 2842-2858 (2008).
Xie, T., "Tunable polymer multi-shape memory effect," *Nature Letters*, 464: 267-270 (2010).
Xu, S., et al., "Soft Microfluidic Assemblies of Sensors, Circuits, and Radios for the Skin," *Science*, 344: 70-74 (2014).
Yap, H.K., et al., "High-Force Soft Printable Pneumatics for Soft Robotic Applications," *Soft Robotics*, 3(3): 144-158 (2016).
Younsheng, L. and Shuiping, S., "Strength Analysis and Structural Optimization of U-Shaped Bellows," *Int. J. Pres. Ves. & Piping*, 42: 33-46 (1990).
Touloukian et al., "Thermal Expansion Metallic Elements and Alloys," Thermophysical Properties of Matter, vol. 12 (1975).
Touloukian et al., "Thermal Expansion Nonmetallic Solids," Thermophysical Properties of Matter, vol. 13 (1977).
Konakovićet al. "Beyond developable: computational design and fabrication with auxetic materials," ACM Transactions on Graphics (TOG), vol. 35, Issue 4, Article No. 89 (Jul. 2016).
Nayakanti et al. "Twist-coupled kirigami cellular metamaterials and mechanisms," arXiv:1707.03673v1 [physics.app-ph] (2017).
Papadopoulou et al., "Heat-active auxetic materials," in Active Matter, MIT Press (2017).
Santulli, C. & Langella, C. "Study and development of concepts of auxetic structures in bio-inspired design," Int. J. Sustainable Design, 3:1 (2016).
Review: The Arrow Smart Shirt—https://www.livemint.com/Leisure/RTUZItGj1nEBfTdPTYJFEN/Review-The-Arrow-Smart-Shirt.html printed Aug. 20, 2019.
Cityzen smart shirt tracks your health, recharges during washing—https://newatlas.com/cityzen-smart-shirt-sensing-fabric-health-monitoring/30428/ (Feb. 3, 2014).
Hexoskin Smart Shirt—https://www.hexoskin.com/ printed Aug. 20, 2019.
Nike HyperAdapt. Self-Lacing Shoes—https://www.nike.com/us/en_us/c/innovation/hyperadapt printed Aug. 20, 2019.
Men's Apollo Dress Shirt—White—Ministry of Supply, https://ministryofsupply.com/products/apollo-3-dress-shirt-white printed Aug. 20, 2019.
MIT Media Lab—Tangible Media Group—bioLogic—https://tangible.media.mit.edu/project/biologic/ printed Aug. 20, 2019.
Hanuska et al., Smart Clothing Market Analysis (printed Aug. 20, 2019).
Tabuchi, H. "Products and competition stretch market for 'athleisure' clothing," The New York Times, Mar. 25, 2016.
Advanced Functional Fabrics of America (AFFOA) Project Call 1.0 Full Proposal, Jun. 2017.
Ackerman, E. "This self-poofing fabric transforms from t-shirt to parka," IEEE Spectrum, Mar. 18, 2017.
Papadopoulou et al., "Auxetic materials in design and architecture," Nature Reviews—Materials, 2:17078, Dec. 5, 2017.
Meier et al., "An objective 3D large deformation finite element formulation for geometrically exact curved Kirchhoff rods," Computer Methods in Applied Mechanics and Engineering, Aug. 2014.

\* cited by examiner

ACTIVE LATTICES

RELATED APPLICATION(S)

This application claims the benefit of U.S. Provisional Application No. 62/445,479, filed on Jan. 12, 2017. The entire teachings of the above application are incorporated herein by reference.

BACKGROUND

Traditionally, auxetic materials and structures (materials that have a negative poisson ratio) exhibiting uniform transformation in x,y or x,y and z directions are produced by geometric patterns but require manual or mechanical stretching of the material. Improved lattices that are less expensive in terms of cost and energy are needed.

SUMMARY

Described herein are active lattice structures that provide precise physical transformations upon exposure to an external stimulus, such as an external source of energy. In many instances, the physical transformations are repeatable.

Members are connected to form a 2-dimensional or 3-dimensional lattice structure. One or more of the members is an active member within the lattice structure. The active member has the capability to autonomously self-transform from one shape into another shape after being subject to an external stimulus (e.g., heat, moisture, UV light, electricity, or other forms of energy). The transformation can be along the length of the member or perpendicular to the length of the member. The combination of multiple members in different orientations within the lattice can cause either local or global transformation. Local transformation can create tighter or more open areas of the lattice structure. Global transformation can promote global shape change of the entire lattice structure, such as changing from a block to a thin plate, or from a block with a flat top to having a deformed top, or deformed sidewalls, or scale up or down in all dimensions uniformly. This can create custom cushioning, absorption or predictable and customizable structural performance of solid lattice/foam-like materials.

Described herein is an active lattice. Typically, an active lattice is formed from a plurality of links interconnected to each other at a plurality of nodes. At least a subset of links include at least two materials that have different coefficients of expansion in response to an external stimulus. Typically, the at least two materials are arranged in an alternating, periodic pattern. In some instances, at least a subset of the links can be oriented parallel to each other, with multiple fore and aft nodes interconnecting the parallel links to common fore and aft links, respectively. The plurality of links can intersect to form quadrilaterals. In some instances, the nodes are formed of slots defined in the links. The links can have mated slots, or the links can be fed through slots in other links. At least a subset of the nodes can be formed of a single material. At least a subset of the nodes can be formed of at least two materials that are the same as the materials of the links or different from the materials of the links. At least some of the nodes can include two strips of materials of different thermal expansion rates in an alternating closed loop pattern. The active lattice can be a planar two-dimensional grid. In some embodiments, the active lattice comprises a plurality of planar two-dimensional grids.

In some instances, an active lattice can include a plurality of flexible, composite films. The flexible films include a base layer and secondary layers affixed on opposite sides of the base layer in a periodic alternating pattern. The base layer can have a greater coefficient of thermal expansion, for example, than the secondary layers. The flexible, composite films are interconnected at slots in the flexible, composite films. In one particular embodiment, the base layer is polyethylene. In one particular embodiment, the secondary layers are polyethylene terephthalate.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Active Members

The material composition and characteristics of active members within a lattice can influence the flexibility, strength, breathability and ultimately the physical and spatial transformation of the lattice structure. An active member can be of link or node type. An active lattice can be comprised of only links where at least one of the links is an active member, or of both links and nodes where at least one of nodes or links is an active member.

As shown in the figures, the active members are formed of at least two different materials that have different coefficients of expansion in response to an external stimulus.

Active Links

A link is a member of the active lattice structure. An active link is composed of at least two materials of different characteristics leading to physical transformation when the member is exposed to a specific type of stimulus (heat, moisture, UV light, electricity) or to a combination of different types of stimuli. For example, a two-layer straight active link composed of two materials of significantly different expansion rates (deposited as two different layers bonded together one on top of the other, and on opposite sides of a base layer) when exposed to heat will result in a curved/buckled shape. The curved/buckled shape is the result of the different coefficients of thermal expansion of the two materials, which leads to uneven material expansion/shrinkage. Upon termination of heat exposure, the link returns to its initial shape.

Figure 6A:
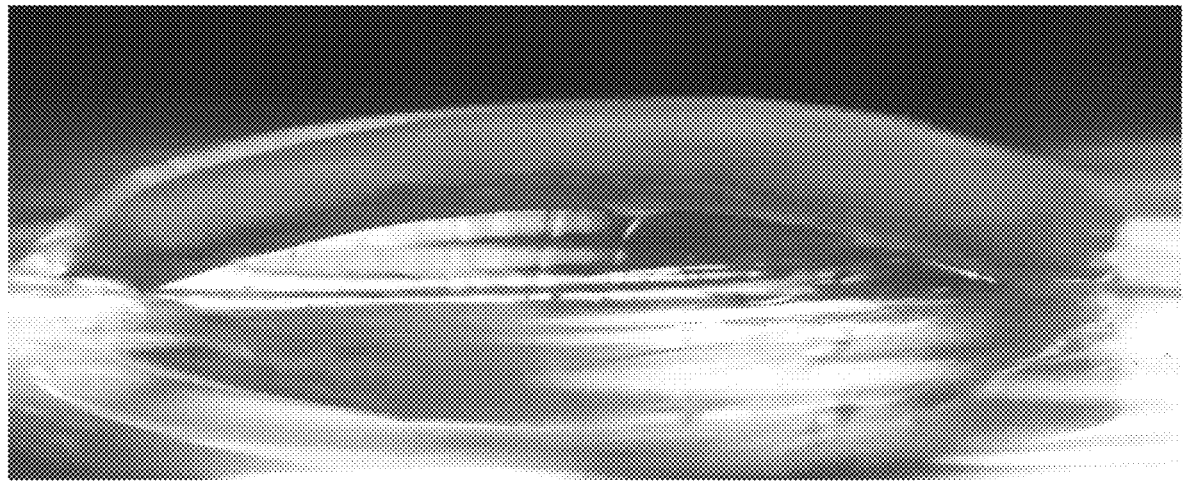
FIGS. 6A-B are images of embodiments of active links that transform upon exposure to water, with FIG. 6A showing the active link just upon exposure to water and FIG. 6B showing the active link after exposure to water for a period of time.
Figure 6B:
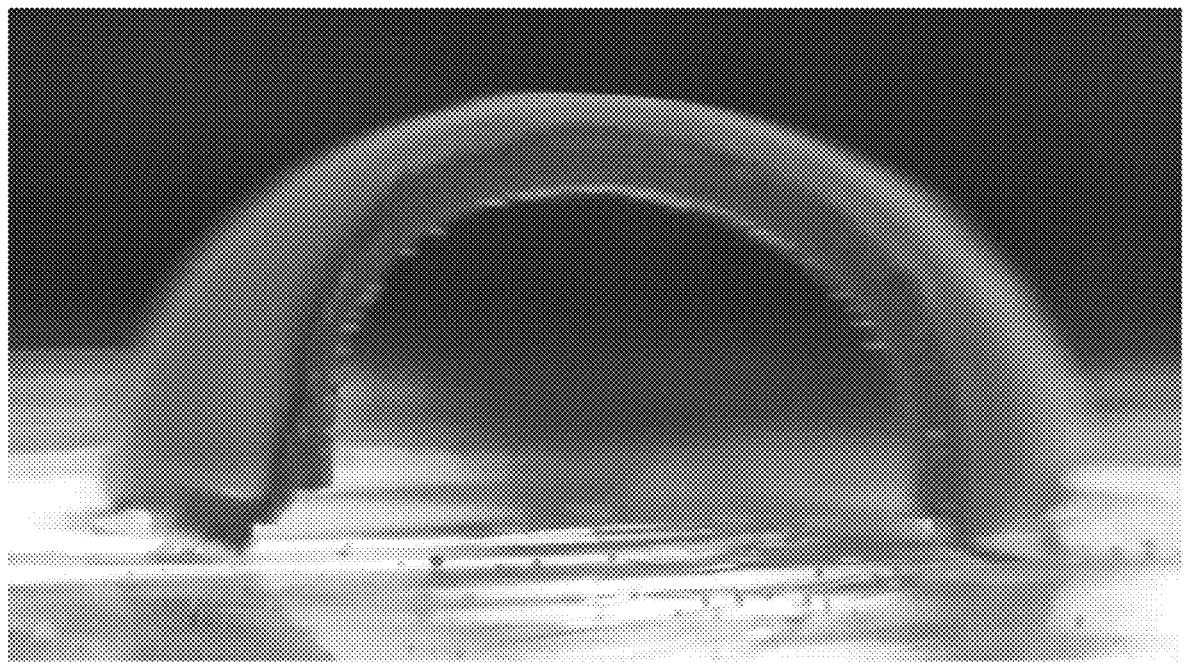

Similarly, a straight active link composed of materials of different swelling capacity when immersed in water or exposed to high moisture levels will transform into a curved shape due to the different rates of material expansion caused by water absorption. Upon termination of moisture exposure, the link returns to its initial shape. FIGS. 6A-B are images of active links that transform upon exposure to water or elevated moisture levels. In this particular embodiment, the active links are formed from a hydrogel and a flexible polymer, with the hydrogel being the material that expands upon exposure to water.

The position of each material in the layered composition of the active link plays a useful role in the folding orientation of resultant transformation. For example, in a heat-active two-material (or two-layer) link, if an expanding material is on the outside of the link, then the link will curve such that the expansion is on the outside of the curve. If a shrinking material is on the inside of the link, then the link will curve such that the shrinking is on the inside of the curve.

The extrusion orientation of each of the materials used for the layered link can also influence the transformation that occurs. When a polymer is extruded into a film, the extrusion process often confers a bias to the film in the direction of the extrusion axis. When the extruded film is laminated to another film, the orientation of this bias can influence the natural curling direction after activation. The natural curling direction will usually follow the extrusion direction; however, the overall shape of the pieces or other external factors, like stiffness or added constraints, can also influence the direction of transformation. For example, if a rectangular shape is cut such that one side is much longer than the other side, even if the biased curling direction is oriented along the shorter axis, the longer axis of the rectangle might still curl given that there is much more material and therefore greater expansion and force when activated. Thus, the natural curling direction of the material, as well as the overall shape and other constraints, need to be taken into consideration when designing for the shape transformation.

Other material properties, such as thickness, shape, stiffness can also affect the transformation of the active lattice structure both locally and globally. For two layers of the same polymer, where one layer is thicker than the other, the thicker layer will likely transform less than the thinner layer. This is because the thicker layer is more stiff and heavier and requires a greater force to overcome the weight and stiffness of the material. However, if the material is too thin, it may not be able to generate enough expansion/contraction force to transform. Similarly, the thickness of the material can influence the time that it takes to transform because a thicker material may take more time to heat or to absorb moisture, so the force and activation time can vary with the thickness of the material. Even while keeping the same materials and the same thickness, varying the stiffness or density of material can impact the transformation because the material that is more flexible will likely transform more quickly and require less force to transform.

Active Nodes

A node is a member of the active lattice structure. Nodes are located at the intersection of links, connecting two or more links. An active node is composed of a combination of at least two materials of different characteristics leading to physical transformation when the member is exposed to a specific type of energy (heat, moisture, UV light, electricity) or to a combination of different types of external stimuli. A single material active node expands or shrinks when subjected to energy and returns to its initial shape upon termination of its exposure to a specific energy or combination of specific energies. For example, if a single material node has high swelling capacity, it will expand when immersed in water, leading to the expansion of the area of the overall lattice structure.

A node composed of two or more materials will transform when subjected to a specific energy or a combination of specific energies because of the different expansion/shrinkage rates of the materials relative to the energy/energies used. Similarly to the multi-material links, the position of each material in the layered composition of the active node and the extrusion direction of each of the materials of the layered composition play a role in the folding orientation of a resultant transformation. For example, a two-layer node composed of two strips of materials of different thermal expansion rates in an alternating closed loop pattern creates a ring whose volume shrinks when exposed to heat, and returns to its initial shape upon termination of its exposure to heat. A ring or multiple intersecting rings can be used as nodes to connect links in expanding lattice surfaces or volumes.

Many of the lattices described herein do not require an active node, but can be formed by slots defined (e.g., cut) in the links. In some embodiments, the links can have mated slots, which can be slots cut partway (e.g., approximately halfway) through two or more links. In other embodiments, one link can have a slot therein, and another link can be fed through the slot.

Geometry of Active Lattices

The geometry of active lattices is the result of the pattern of connections between the members of the lattice (including non-active members, if any). The pattern of connections between the members influences the global transformation of the lattice structure. The pattern of connections of the members, along with the type and composition of the members determine whether the lattice, when subjected to specific type(s) of stimuli, will transform in one, two or three dimensions. Apart from the global transformation of the lattice, the pattern of connections between the members, along with the type and composition of the members, determines the local shape transformations, which may or may not affect the overall volume and global shape of the lattice. Various geometries and different types of external stimuli can be used to achieve active shape change and active global transformations.

1D Global Transformation

Using patterns for a one-dimensional (1D) global transformation, an active lattice can expand in one direction when exposed to specific type(s) of energy, and return to its initial state upon termination of the exposure. The structure of the active lattice can be either a planar two-dimensional grid or a three-dimensional grid. For example, a heat-active planar lattice that actively transforms in one dimension can be made of linear active links that includes two types of material components of different thermal expansion rates and equal length, whose position alternates from top to bottom of the link in a periodic manner.

The lattice can include multiple active links of such composition that are positioned in parallel to each other, with alternating orientation along their longitudinal axis, and bonded together at the center of each of the alternating material components of the links. When exposed to heat, each of the active linear links of the lattice transforms into a sinusoid link because of the different thermal expansion rates of the two materials. When the lattice is uniformly exposed to heat, it expands in direction perpendicular to the length of the links. Upon termination of the exposure to heat, the overall structure and individual link members return to their initial shape.

Figure 1A:
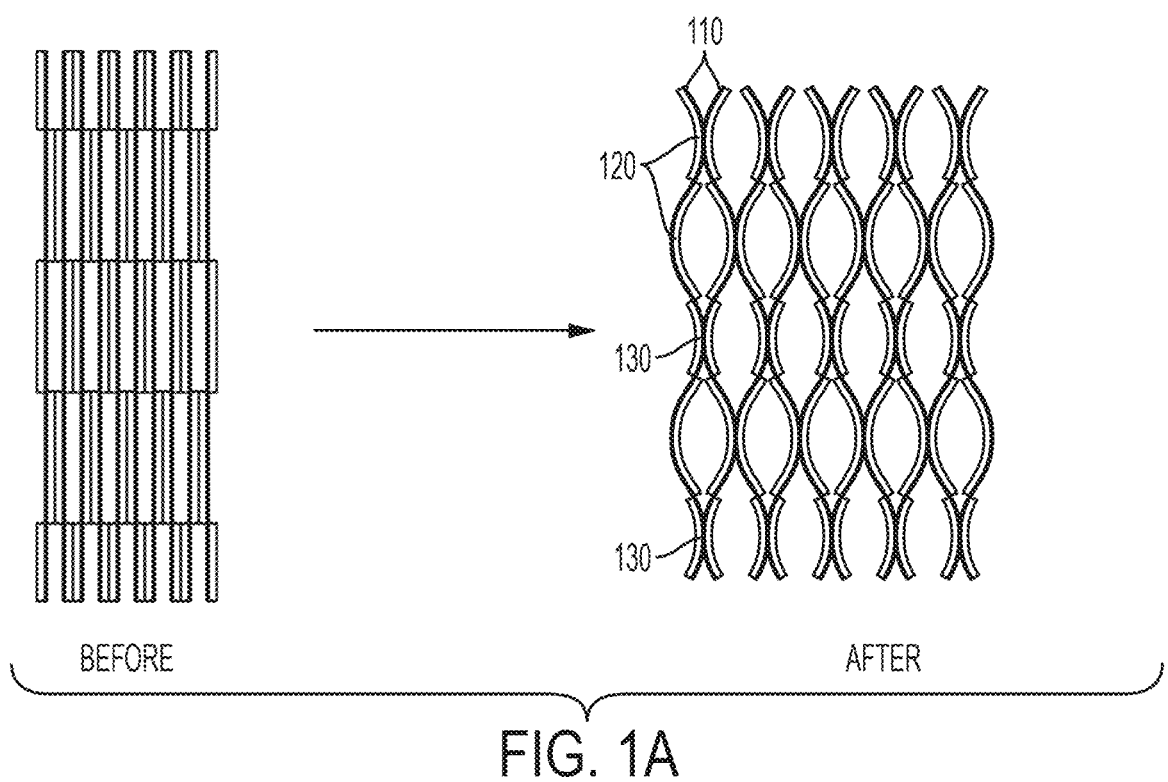
FIG. 1A is an illustration of one-dimensional transformation of a lattice composed of active links, where the active links have layers of two alternating materials with different coefficients of thermal expansion.
Figure 1B:
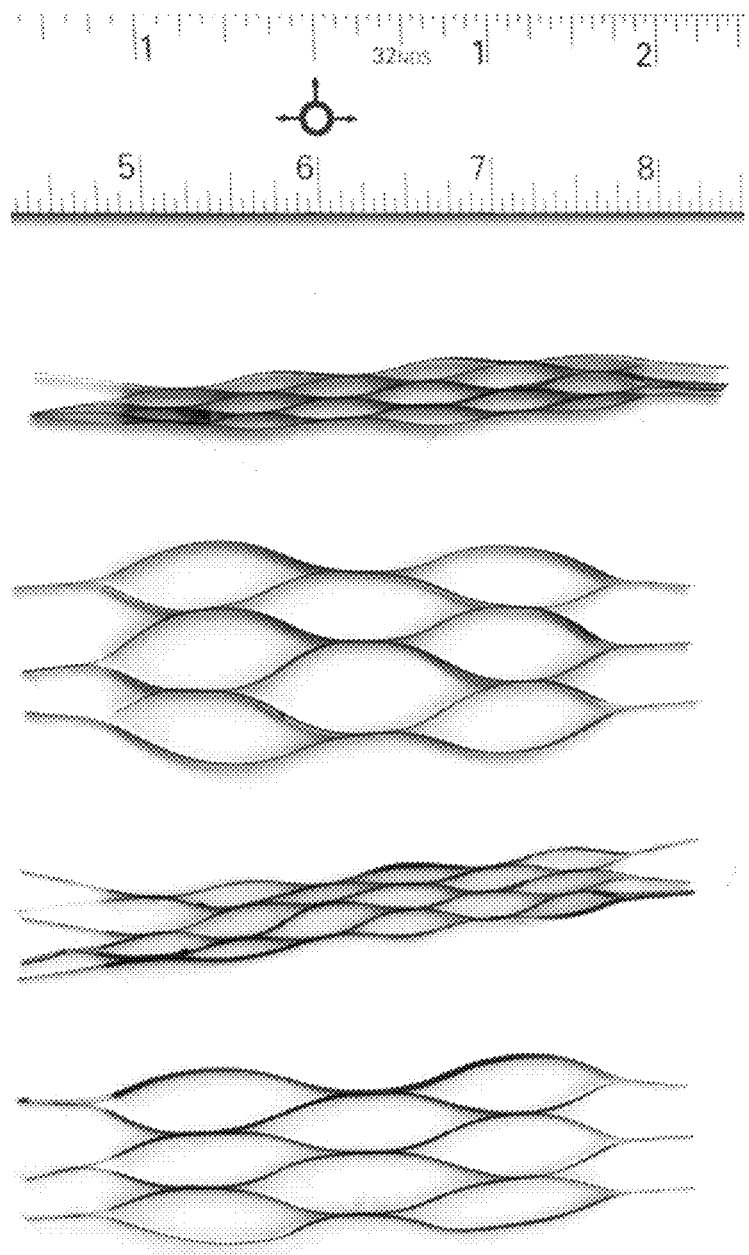
FIGS. 1B and 1C are images of embodiments of an active lattice composed of active members that is not exposed to heat (FIG. 1B) and that is exposed to heat (FIG. 1C).
Figure 1C:
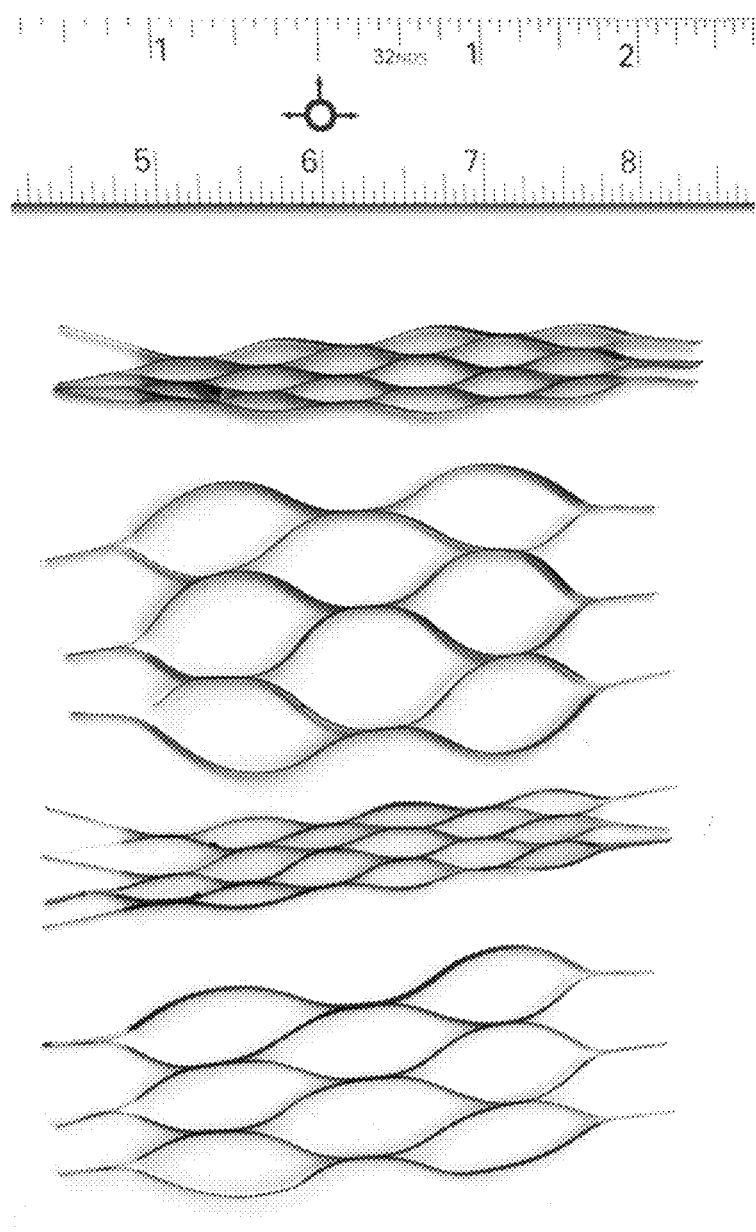

FIGS. 1A-C show an embodiment of an active lattice that is formed from interconnected flexible films. In this particular embodiment, the flexible film is formed of a base layer with secondary materials affixed on opposite to the base layer in a periodic, alternating pattern. The base layer has a greater coefficient of thermal expansion than the layers affixed to the base layers. In this particular embodiment, the base layer is a thin film of polyethylene (PE), and the secondary material is polyethylene terephthalate (PET). As illustrated in FIG. 1A, segments of PET (120) are affixed to a first side of the PE base layer (110, filled segment) so that there are periodic gaps in the PET (120, open fill segments). For clarity, only some of the segments of PET are labeled with reference numeral 120. Segments of PET (120) are subsequent affixed to a second side of the PE base layer (110) opposite of those portions of the PE base layer (110) where there is a gap in the PET (120). The resulting flexible film is a layer of PE (110) with segments of PET (120) on opposing sides in a periodic, alternating pattern. Small slots are cut in the flexible, composite films so that adjacent films can be interconnected at the slots (130). FIGS. 1B and 1C are images of embodiments of an active lattice formed from a plurality of such flexible, composite films. In FIG. 1B, the embodiment is not exposed to heat. In FIG. 1C, the embodiment is exposed to heat.

2D Global Transformation

Using patterns for 2D global transformation, an active lattice can expand in two dimensions when exposed to specific type(s) of stimuli, and return to its initial state upon termination of exposure to the stimuli. The structure of the active lattice can be either a planar two-dimensional grid or a three-dimensional grid. For example, a heat-active planar lattice that actively transforms in two dimensions can be made of linear active links that includes two materials of different thermal expansion rates and equal length, whose position alternates from top to bottom of the links in a periodic manner. The lattice includes multiple active links of such composition that are positioned in an orthogonal orientation within a rectangular grid. The links are parallel to one another and are positioned in alternate orientation along their longitudinal axis. The links are connected through vertical slots that allow the links with orthogonal orientation to slide into each other. When exposed to heat each of the active linear links transforms into a sinusoid link because of the different thermal expansion rates of the two materials, reducing the area of the overall structure in both the x and y axis. When the lattice is uniformly exposed to heat, it expands in two dimensions, perpendicular to the length of the links. Upon termination of the exposure to heat the overall structure and individual link members return to their initial shape.

Figure 2A:
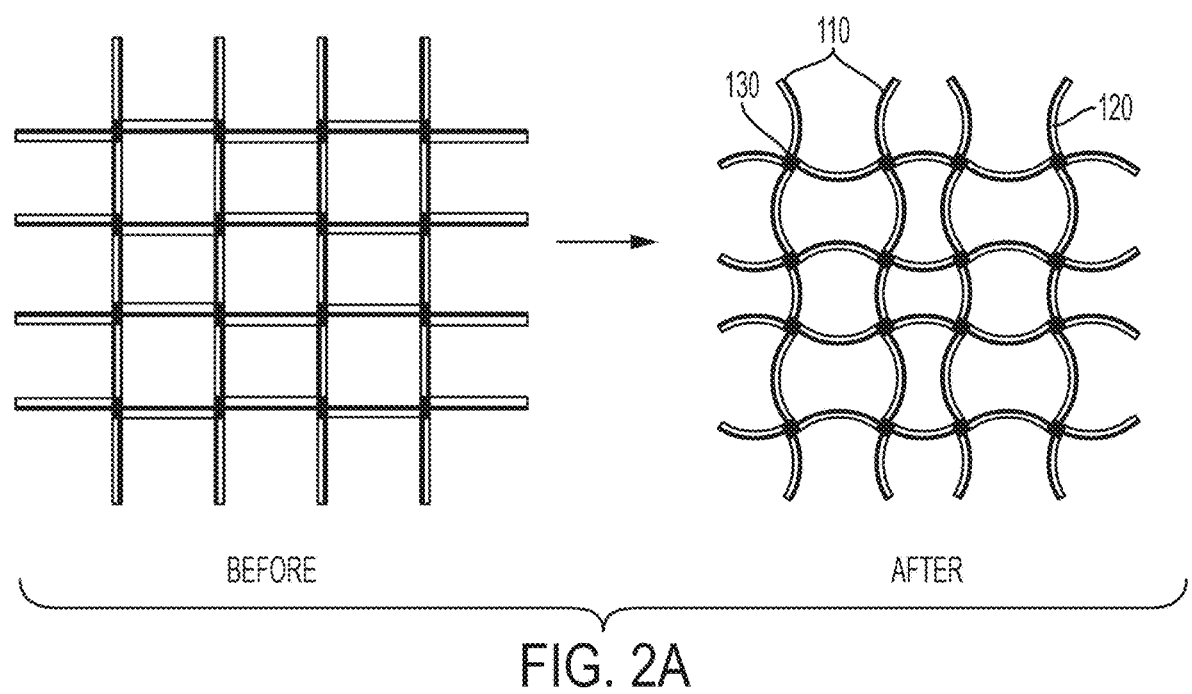
FIG. 2A is an illustration of two-dimensional transformation of a lattice composed of active links, where the active links have layers of two alternating materials with different properties.
Figure 2B:
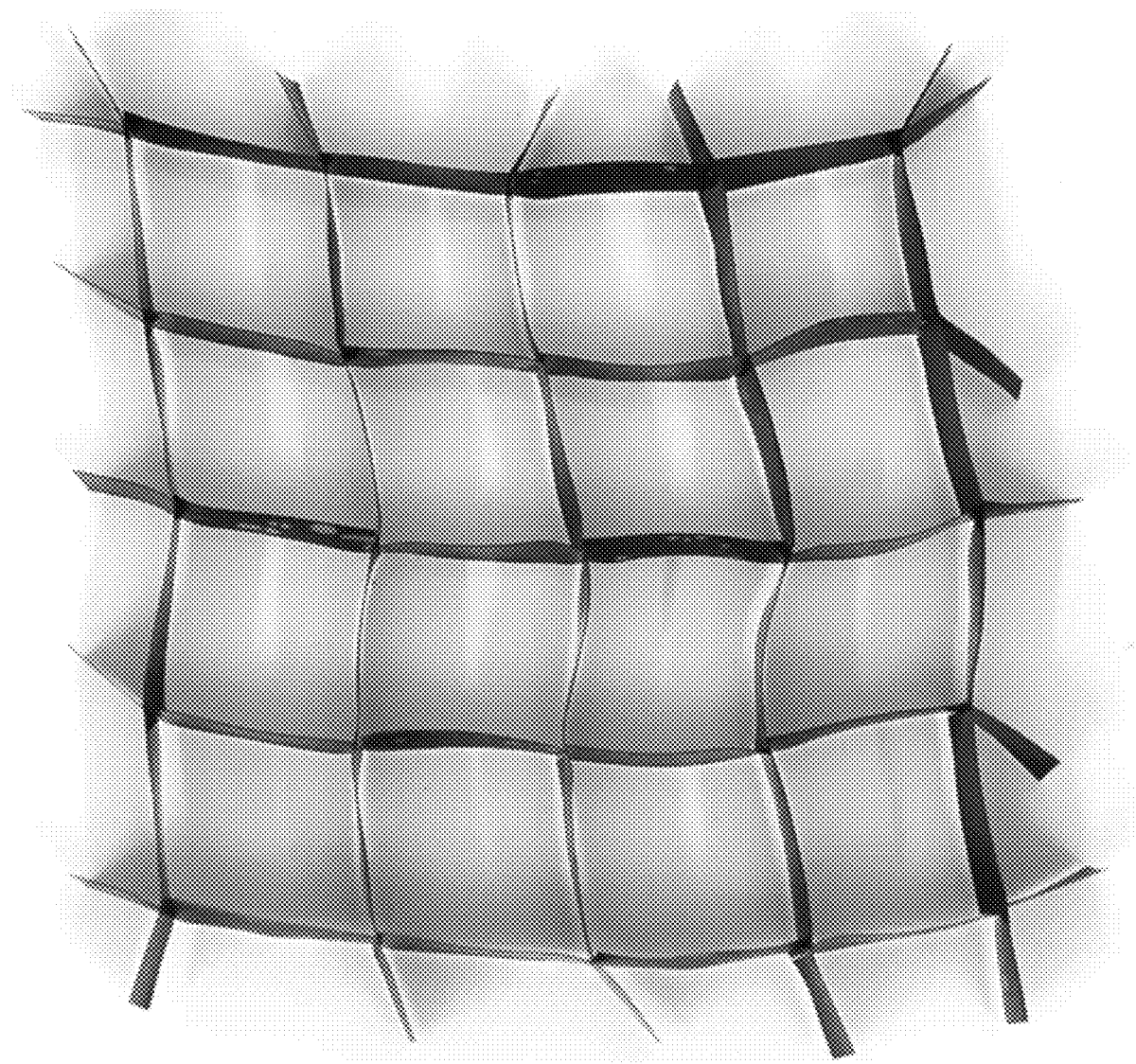
FIGS. 2B and 2C are images of embodiments of an active lattice composed of active members that is not exposed to heat (FIG. 2B) and that is exposed to heat (FIG. 2C).
Figure 2C:
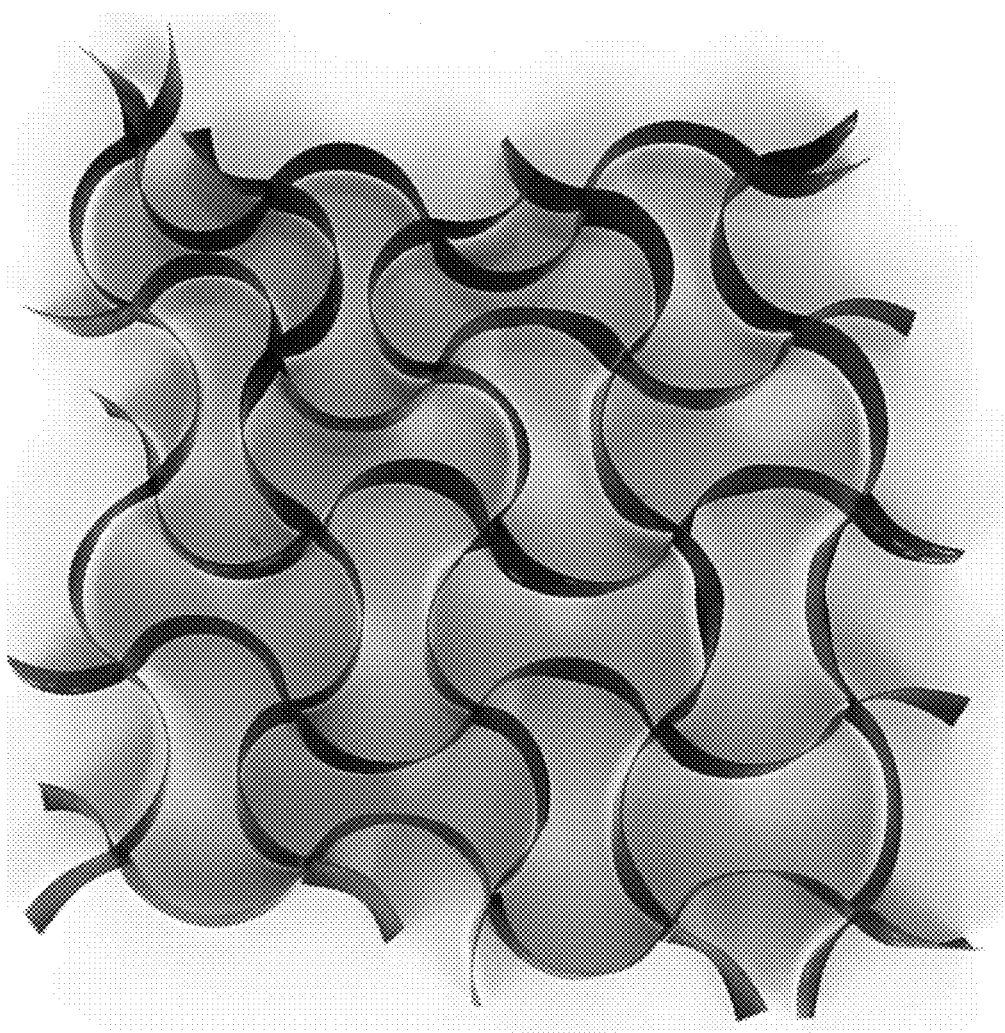

FIGS. 2A-C show an embodiment of an active lattice that is formed from interconnected flexible films. In this particular embodiment, the flexible film is formed in a similar manner to the flexible film described with respect to FIGS. 1A-C. Small slots are cut in the flexible, composite films so that adjacent films can be interconnected at the slots. FIGS. 2B and 2C are images of embodiments of an active lattice formed from a plurality of such flexible, composite films. In FIG. 2B, the embodiment is not exposed to heat. In FIG. 2C, the embodiment is exposed to heat.

3D Global Transformation

Figure 3A:
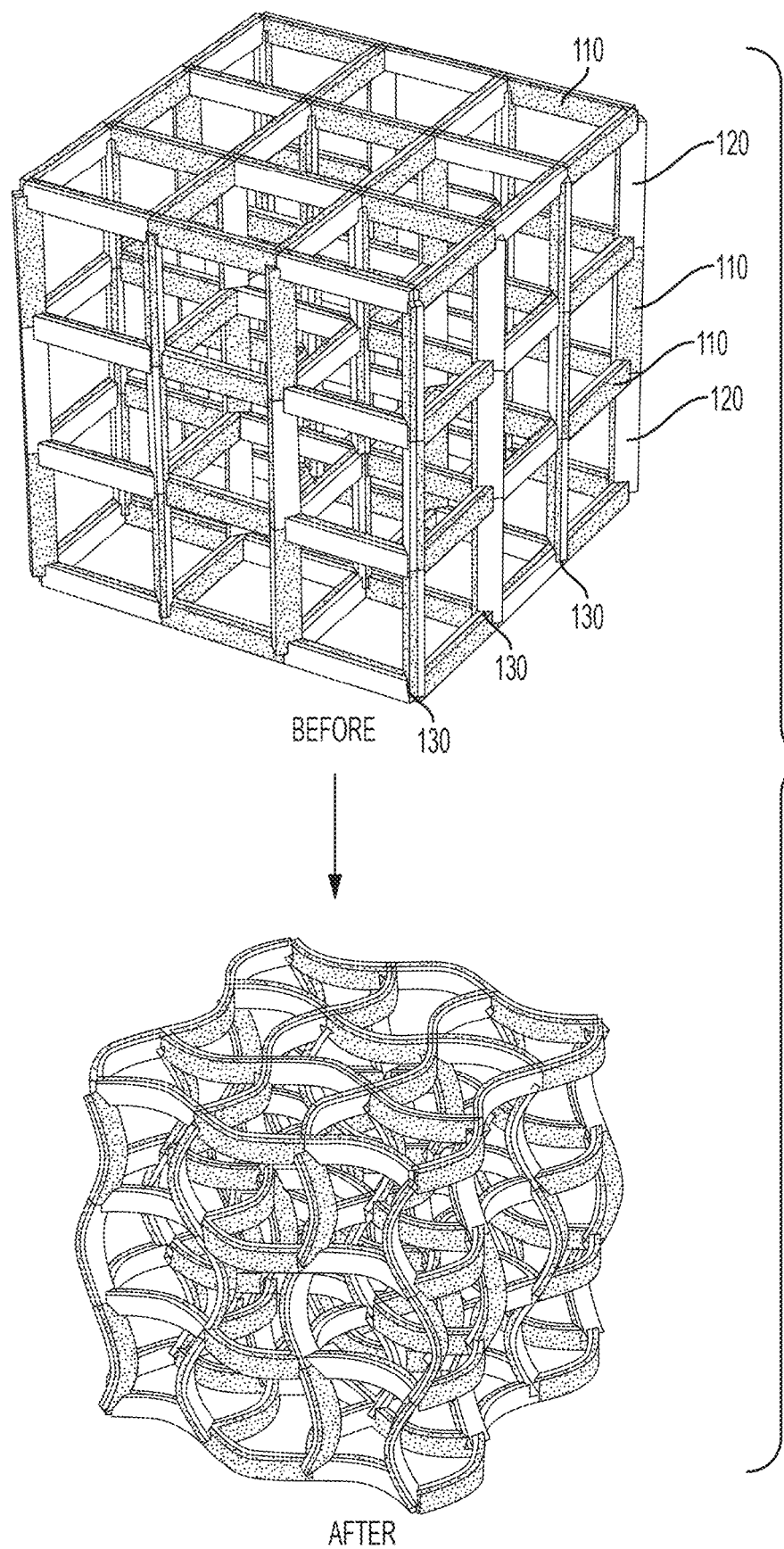
FIG. 3A is an illustration of three-dimensional transformation of a lattice composed of active links, where the active links have two layers composed of two alternating materials with different properties.
Figure 4:
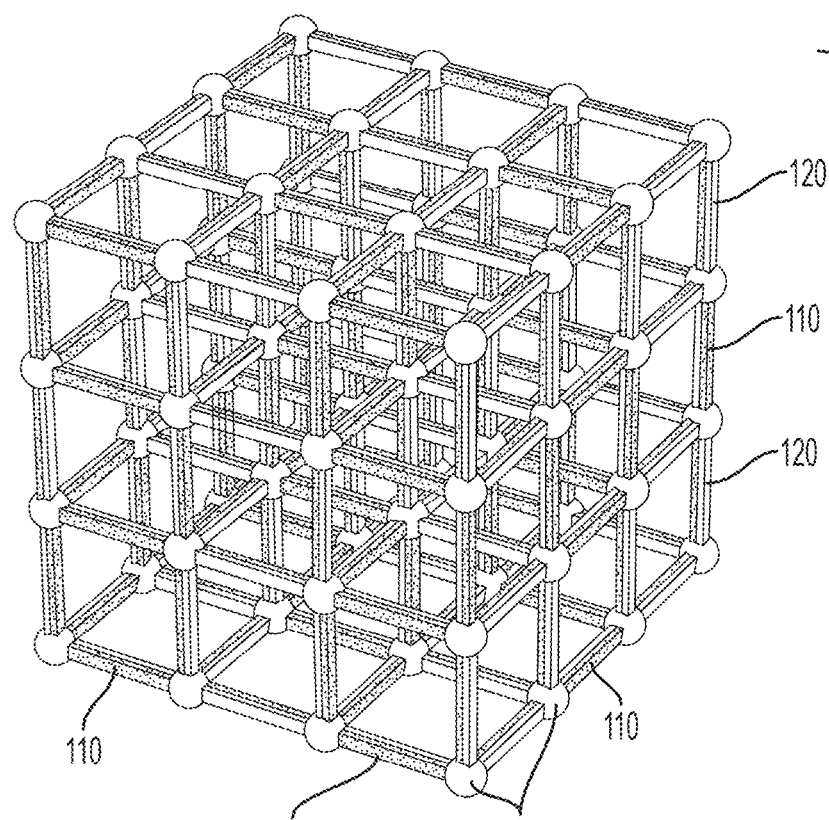
FIG. 4 is an illustration of three-dimensional transformation of a lattice composed of active links and nodes that have two layers composed of two alternating materials with different properties.
Figure 4:
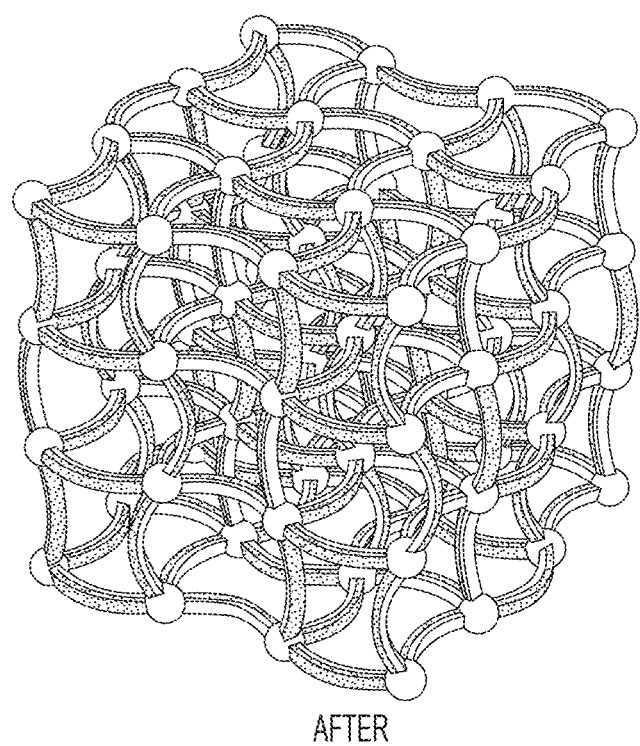
Figure 5:
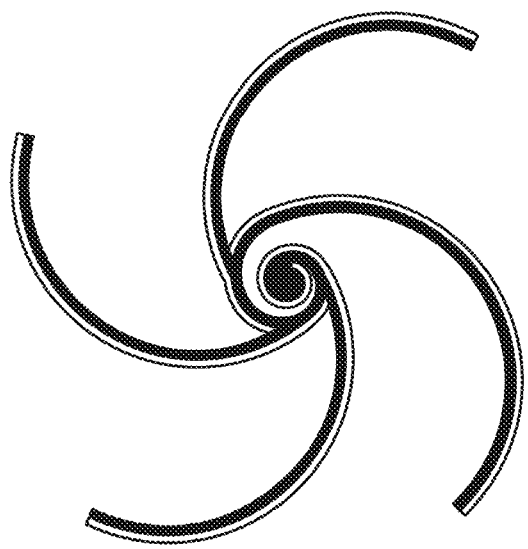
FIG. 5 is an illustration of an active node.
Figure 5:
Figure 5:
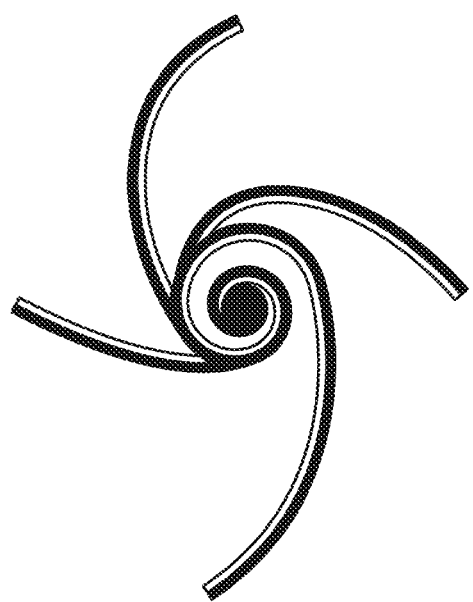

Using patterns for 3D global transformation, an active three-dimensional lattice can expand in three directions when exposed to specific type(s) of external stimuli, and return to its initial state upon termination of exposure to the external stimuli. For example, a heat-active three-dimensional cubic lattice that actively transforms in three dimensions can be made of multiple planar rectangular lattices that include linear active links, similar to the planar active lattices that transform in two dimensions. The planar active structures are connected with linear active links at each of the link intersection vertical slots that allow the links with orthogonal orientation to each other to slide into one another. All active links include two layers of material components of different thermal expansion rates and equal length, whose position alternates from top to bottom of the link in a periodic manner. When the lattice gets uniform heat exposure, it expands in the x-axis, y-axis and z-axis. Upon termination of the exposure to heat the overall structure and individual link members return to their initial shape (FIG. 3A). A similar configuration of three-dimensional transformation can be achieved if the three-dimensional grid is composed of both nodes and actives links, where the links intersect in an orthogonal relation and the nodes are positioned in the intersections (FIG. 4).

Figure 3B:
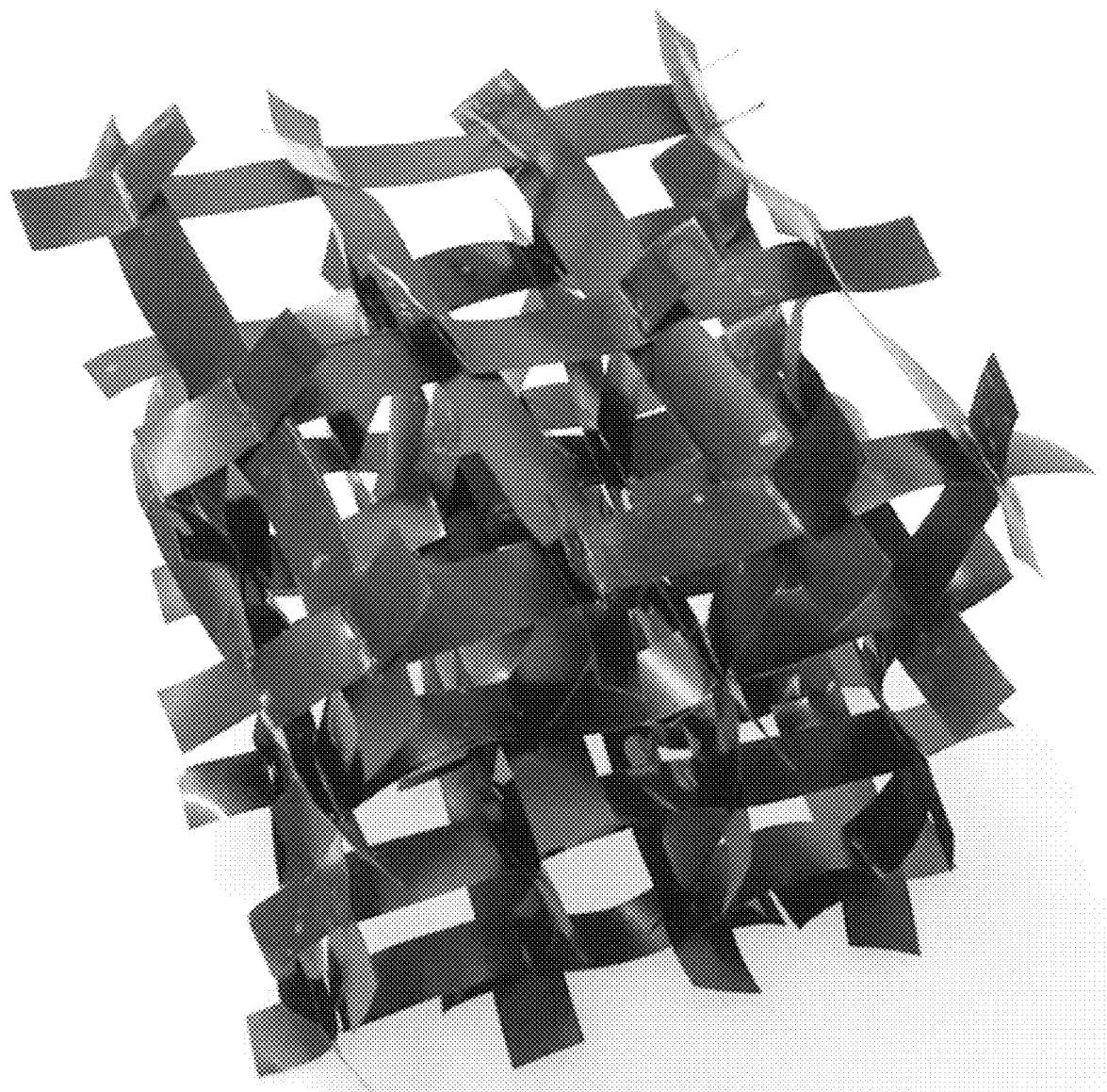
FIGS. 3B and 3C are images of embodiments of an active lattice composed of active members that is not exposed to heat (FIG. 3B) and that is exposed to heat (FIG. 3C).
Figure 3C:

In the embodiment of FIGS. 3A-C, an active lattice is formed from interconnected flexible films, which are formed in a similar manner to the flexible film described with respect to FIGS. 1A-C. Small slots are cut in the flexible, composite films so that adjacent films can be interconnected at the slots. Some of the flexible films can be narrower or wider than others to permit, with narrower films feeding through slots in the wider films. FIGS. 3B and 3C are images of embodiments of an active lattice formed from a plurality of such flexible, composite films. In FIG. 3B, the embodiment is not exposed to heat. In FIG. 3C, the embodiment is exposed to heat.

Non-Uniform Transformation

If an active lattice designed for 1D, 2D, or 3D global transformation when subjected to specific type(s) of stimuli (e.g., heat, moisture, UV light, electricity) is only locally exposed to the specific type(s) of stimuli, then only the portions exposed to the stimulus will transform as designed, resulting in a local, non-uniform transformation of the lattice.

Selective Transformation

An active lattice can be designed for 1D, 2D, or 3D selective transformation if only restricted areas of the lattice are designed to respond to the subjected energy/energies (heat, moisture, UV light, electricity). Thus, with uniform activation energy a non-uniform transformation can result.

Fabrication of Active Lattices

The geometry of the overall lattice structure, as well as the geometry and materials of the active members, determines the strength, flexibility and transformation pattern of the lattice when exposed to specific type(s) stimuli (heat, moisture, UV light, electricity). Depending on the desired transformation pattern and structural properties (strength, flexibility/stiffness, density) various fabrication methods can be used for the active members and their assembly into a lattice structure. One preferred composition for active members is two or more materials of significantly different responsive properties to the stimulus used for shape transformation. The active member can, alternatively, be composed of a single material, such as a hydrogel, which expands when subjected to the moisture and returns to its initial state upon termination of the activation. The extrusion orientation of each of the materials used for the layered link can also influence the transformation that occurs, and changing the orientation of one material relative to the grain/extrusion direction of another material can provide different transformations of the active lattice.

Both the overall structure and the members themselves can be made by the same fabrication means. For example the whole lattice including all material components could be 3D-printed. Alternatively, two or more means can be used. For example, the members can be laminated and then assembled together to form the overall lattice structure.

Bonded Active Members

The different materials that compose the active members must be sufficiently bonded together to provide a strong composite. Bonding may be easily achieved if some or all of the materials have an adhesive surface, or by added adhesives for lamination process or by stitching, riveting or other physical connection. The material components can be laser-cut or cut in a milling machine from 2-dimensional sheets of plastics, and then sandwiched together with adhesives to produce the active member. Lamination allows for fast production of large quantities of materials of multi-material composites. The better the different materials bond to each other, the more the composite active member will behave in the desired way and transform in the correct pre-determined shape.

Bonded Active Lattice

Active and non-active members can be added together through bonding to form a lattice. Bonding of members may be achieved though the addition of adhesives or by stitching, riveting or other physical connection. Although the bonding choice of lamination can be used for the bonding of the lattice members, lamination doesn't allow for direct fabrication of the overall structure, and also limits the type of three-dimensional lattice that can be created (for example it doesn't allow for the creation of spherical solid nodes). Bonding allows for connecting together members formed by various techniques including, bonding, 3D printing, and weaving. If the members are strongly connected together through bonding the lattice becomes very stable, however this stability might compromise flexibility in the transformation process (provided, for example, through weaving that requires no adhesion).

3D Printed Active Members

The materials used for active members can be fabricated and added together by means of 3D printing. Either all of the different materials are fabricated by 3D printing means, or only some of the material are fabricated by 3D printing means and added on top of prefabricated material sheets during the printing process. 3D printing allows for custom height, width and pattern of grain to be easily designed and controlled. Special attention needs to be given on the combination of materials used, as not all materials adhere to each other in the printing process. 3D printing may be combined with lamination, bonding or other assembly techniques.

3D Printed Active Members

Part or whole of the active lattice structure can be fabricated by means of 3D printing. 3D printing allows for both the material composition of the members and the connections of the whole structure to be built at once through multi-material printing or printing in different phases. Thus, although 3D printing is a relatively slow process, if all the parts are made through the same means, the process becomes more efficient compared to other techniques that require the combination of various additive methods. Moreover, 3D printing allows for direct control of extrusion direction, thickness and other properties of the material grain leading to accurate active lattice transformations. If not all the material can be added through 3D printed means then 3D printing can be combined with bonding, manual assembly or other physical connections methods. For example, a structure (that includes, in part, active members) can be made of a specific plastic and then another material can be overlaid on top of the members to achieve the necessary composition for active transformations.

Manual Assembled Lattice

To form a lattice, the members of the lattice can be manually assembled through intersecting the members together with slots and cuts, as with the lattices of FIGS. 1A-C, 2A-C, and 3A-C. In a manually assembled lattice the members are positioned in place, without requiring adhesion, bonding or any technique that alters the material properties of the active member components. Compared to bonding, 3D printing and other techniques that result to unification of the parts, manual assembly offers more freedom of movement between the different members, allowing for the transformation from one lattice shape to the other to happen freely and smoothly during and after the activation process. However, manual assembly techniques, because of the relative loose interconnections of the members, may result in unstable structures compared to other assembly techniques. Thus, manual assembly can be combined with bonding for more stable (however less flexible) results.

Activation

The third and final principle for creating active lattice structures is the specific external stimulus (e.g., activation energy) applied to the lattice structure.

External Stimulus

The type, amount and location of the applied activation energy to the active lattice will create different transformation characteristics based on the pattern and amount of active material. For example, if a minimal amount of heat-active material is built into the structure and then heat is applied to the entire structure, the resultant transformation will be local, based on the location and direction of the heat-active member. The lattice without the active member should not respond to the heat, only the heat-active member will shrink and cause local transformation or global transformation, based on their axis of transformation and their orientation in the lattice structure. Conversely, if the entire lattice structure is created with heat-active members a very different transformation may occur if the entire composite is subject to heat. A global shrinking or expanding shape should emerge rather than local transformation in the previous example. However, if the heat is applied in a precise and local pattern, then a similar local transformation may occur. This demonstrates that the location of the applied energy has a direct impact on the type of transformation. Similarly, the amount of activation will cause different transformation characteristics. For example, if more heat is applied in a short amount of time it may speed up the transformation, depending on the active material's characteristics. The length of time may also impact the shape transformation, where a longer application of activation energy may produce a different shape by allowing the material to transform more than if the activation energy was applied only for a short amount of time. Finally, different types of activation energy, in relation to the active material, can cause different transformation characteristics. For example, water-activated materials may tend to transform slower and less repeatable than heat-active material. Light-active material may tend to react quicker but could be single-direction or have less force whereas heat-active material may be completely repeatable. The location and type of active material based on the supplied activation energy allows for many different transformations with different activations energies, at different times and should be designed specifically for the application and environment of use.

Resultant Shape Transformation

The particular transformation that occurs is influenced by: 1) the material property of the non-active lattice members; 2) the material property, amount and pattern of the active members; 3) the global pattern of the lattice structure and its local/global constraints; and 4) the amount, pattern and time of supplied activation energy. This relationship can be simplified and easily controlled if a single lattice material, active material and activation energy are used. This leaves only the pattern and quantity of the active members, thus the pattern becomes the "program" for creating precise self-transforming lattice materials.

Usage

The lattices described herein can provide 1-dimensional, 2-dimensional, and 3-dimensional precise autonomous transformation of lattices upon exposure to specific type(s) of stimuli (heat, moisture, UV light, electricity or other forms of energy). Transformations include selective and uniform expansion and contraction of three-dimensional structures, as well as complex pre-determined shape transformation of planar or volumetric lattices. Adaptive structures for engineering, apparel, automotive, mechanical and product design applications can be achieved through the accurate control of the lattice activation systems. Electricity, heat, moisture (or other forms of stimuli or energy) can be used for activation and control of lattices for robotic actuation, for adaptive structural components against physical loads in automotive and engineering applications, and for adaptive apparel and product structures or skins for custom functionality, custom shape, better performance and breathability. This method produces predictable precise geometric self-transformations of energy-activated lattices, and is significantly different from traditional approaches of shape changing and structural transformations, as it promotes self-adaptating structures and volumes rather than purely surfaces.

Benefits

The active lattices described herein offers significant advantages over traditional methods of shape changing lattices for engineering, robotic, product and other applications. Traditionally auxetic materials and structures (materials that have a negative poisson ratio) exhibiting uniform transformation in x,y or x,y and z directions are produced by geometric patterns but require manual or mechanical stretching of the material. With active lattice structures, one-dimensional, two-dimensional and three-dimensional transformations can be achieved that can be either selective, or fully auxetic by exposing the structure to moisture, temperature or light or other natural energies. The active lattice allow the structures to adapt to the environmental conditions or self-transform on demand by using the activation energy to trigger the lattice transformation. Active lattices, including auxetic active lattices offer faster, and less expensive in cost and energy, autonomous and adaptive solutions given the reduction of power, electronics, actuators or external devices. As used herein, an "autonomous transformation" occurs without direct application of mechanical force.

Adaptive structures that respond to physical loads by automatically added support and structural extension and compression are being used in engineering in order to achieve lighter, smarter structures. However, adaptive structures, as used today, rely on high amounts of electrical or pneumatic/hydraulic energy to adapt the structure through mechanical means. Contrary to this approach, active lattices can offer low cost, environmentally adaptive structure that use either just heat or moisture or other simple means. Thus active adaptive lattice structures use less energy than mechanically adaptive structure because the structure self-transforms and no mechanical means are required to achieve the transformation.

Moreover, active lattices offer the ability to conceive new forms and new types of smart products for apparel, furniture, robotics, construction, fashion and interior solutions.

Applications

The active lattices can be used in a variety of applications.

Engineering & Construction: Structures that change shape to actively respond to physical loads when triggered by physical activation energies (heat, moisture, electricity etc) leading to adaptive-to-load, lighter structures; structures that change shape to actively respond to the environmental needs, adapting to heat, moisture or other parameters that can trigger the structure's shape; new possibilities for measuring strain, caused by physical loads and environmental parameters in small and large scale engineering application through active lattice structure that actively respond to the parameters measured through shape transformation; new possibilities for adaptive building envelopes to environmental conditions through shape changing shading systems leading to actively sustainable architecture systems; new capabilities for creating dynamic and responsive facades though shape changing patterns and textures; on-demand expandable structures for temporary construction and emergency shelter needs Apparel & Sportswear: Environmentally adaptive apparel and footwear for maximum breathability through transformable active lattice-structured fabrics and soles; new possibilities for dynamically changing patterns and textures in wearable garment; actively adaptive footwear for athletes comfort and performance through adaptation to body's temperature and movements; actively adaptive footwear for orthotics and other medical demands Fabrication & Manufacturing: Expandable and shrinkable components and structures for automated manufacturing and self-assembly construction methods requiring less energy, time, manual labor and needs for shipping; heat, moisture and low voltage electrically active lattices for robotic actuation for fabrication and manufacturing requiring less energy that mechanical actuation and high voltage electroactive mechanisms; automated process for creating complex molding or forming processes through uniformly or non-uniformly distributed energy activation Aviation and Automotive Applications: embedded active lattices in cushions for dynamic support adapting to passenger's preferences, health needs, speed and other vehicle/plane conditions; dynamic active structure systems for car air foils and airplane adaptive wings; structure or interior surfaces of the plane/car that need to adapt Furniture & Interior Products: adaptive cushion and furniture for medical needs, comfort and custom needs; interiors for office and public spaces with controllable properties of visibility, acoustics and heat transfer through lattice structured walls of variable density.

INCORPORATION BY REFERENCE; EQUIVALENTS

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A three-dimensional active lattice comprising:
    a plurality of flexible, composite films that comprise a base layer and secondary layers affixed on opposing sides of the base layer in an alternating, periodic pattern, wherein the base layer has a greater coefficient of thermal expansion than the secondary layers, and wherein the flexible, composite films have slots for interconnecting with each other;
    wherein a first subset of the plurality of flexible, composite films are positioned in parallel to each other, with alternating orientation along their longitudinal axis;
    wherein a second subset of the plurality of flexible, composite films are positioned in parallel to each other with alternating orientation along their longitudinal axis, and wherein the first and second subset of the plurality of flexible, composite films are interconnected at the slots of the flexible films to form a planar, two-dimensional lattice,
    wherein a third subset of the plurality of flexible, composite films are positioned in parallel to each other with alternating orientation along their longitudinal axis, and wherein the third subset of the plurality of flexible, composite films interconnect a plurality of planar, two-dimensional lattices to form a three-dimensional active lattice,
    such that the active lattice exhibits an autonomous, physical transformation in three dimensions due to the greater coefficient of thermal expansion of the base layer compared to the secondary layers.

2. The three-dimensional active lattice of claim 1, wherein the autonomous, physical transformation is shrinkage in three directions.

3. The three-dimensional active lattice of claim 1, wherein the autonomous, physical transformation occurs in response to heat.

4. The three-dimensional active lattice of claim 1, wherein the plurality of flexible films intersect to form quadrilaterals.

5. The three-dimensional active lattice of claim 1, wherein the slots of the flexible, composite films are mated slots.

6. The active lattice of claim 1, wherein the flexible, composite films are fed through slots in other flexible, composite films.

7. The three-dimensional active lattice of claim 1, wherein the base layer is polyethylene.

8. The three-dimensional active lattice of claim 1, wherein the secondary layers are polyethylene terephthalate.

* * * * *